United States Patent
Ho et al.

(10) Patent No.: US 11,772,052 B2
(45) Date of Patent: Oct. 3, 2023

(54) MEMBRANES FOR GAS SEPARATION

(71) Applicant: Ohio State Innovation Foundation, Columbus, OH (US)

(72) Inventors: W. S. Winston Ho, Columbus, OH (US); Yang Han, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 257 days.

(21) Appl. No.: 17/276,368

(22) PCT Filed: Sep. 16, 2019

(86) PCT No.: PCT/US2019/051308
§ 371 (c)(1),
(2) Date: Mar. 15, 2021

(87) PCT Pub. No.: WO2020/056414
PCT Pub. Date: Mar. 19, 2020

(65) Prior Publication Data
US 2022/0032239 A1    Feb. 3, 2022

Related U.S. Application Data

(60) Provisional application No. 62/731,790, filed on Sep. 14, 2018.

(51) Int. Cl.
*B01D 69/14*    (2006.01)
*B01D 53/22*    (2006.01)
(Continued)

(52) U.S. Cl.
CPC ......... *B01D 69/148* (2013.01); *B01D 53/228* (2013.01); *B01D 67/0079* (2013.01);
(Continued)

(58) Field of Classification Search
None
See application file for complete search history.

(56) References Cited

U.S. PATENT DOCUMENTS 7,964,020 B2   6/2011   Bakf et al.
9,216,390 B2   12/2015  Ho et al.
(Continued)

FOREIGN PATENT DOCUMENTS

CN    101821089 A    9/2010
CN    103124590 A    5/2013
(Continued)

OTHER PUBLICATIONS

Han, Yang et al., "Nanotube-reinforced facilitated transport membrane for CO2/N2 separation with vacuum operation", Journal of Membrane Science, 567, Aug. 2018, pp. 261-271. (Year: 2018).*
(Continued)

*Primary Examiner* — Jason M Greene
(74) *Attorney, Agent, or Firm* — Meunier Carlin & Curfman LLC

(57) ABSTRACT

Membranes, methods of making the membranes, and methods of using the membranes are described herein. The membranes can comprise a support layer, and a selective polymer layer disposed on the support layer. The selective polymer layer can comprise a selective polymer matrix and carbon nanotubes dispersed within the selective polymer matrix. The carbon nanotubes can comprise multi-walled carbon nanotubes wrapped in a hydrophilic polymer, such as polyvinylpyrrolidone or a copolymer thereof, such as poly (1-vinylpyrrolidone-co-vinyl acetate). The membranes can exhibit selective permeability to gases. As such, the membranes can be for the selective removal of carbon dioxide and/or hydrogen sulfide from hydrogen and/or nitrogen.

19 Claims, 4 Drawing Sheets

(51) Int. Cl.
  B01D 67/00  (2006.01)
  B01D 69/10  (2006.01)
  B01D 71/02  (2006.01)
  B01D 71/44  (2006.01)
  B01D 71/60  (2006.01)

(52) U.S. Cl.
  CPC ........... *B01D 69/10* (2013.01); *B01D 71/021* (2013.01); *B01D 71/44* (2013.01); *B01D 71/60* (2013.01); B01D 2257/504 (2013.01); B01D 2258/0283 (2013.01); B01D 2311/13 (2013.01); B01D 2315/10 (2013.01); B01D 2323/30 (2013.01); B01D 2325/36 (2013.01)

(56) References Cited

U.S. PATENT DOCUMENTS

| | | | |
|---|---|---|---|
| 2008/0168900 A1 | 7/2008 | Ho | |
| 2010/0206811 A1* | 8/2010 | Ng | B01D 69/10 210/500.21 |
| 2012/0080380 A1* | 4/2012 | Wang | B01D 67/0079 210/500.21 |
| 2013/0341570 A1* | 12/2013 | Chan | B82Y 40/00 252/509 |
| 2014/0370252 A1* | 12/2014 | Regnier | B32B 27/36 156/60 |
| 2016/0263531 A1* | 9/2016 | Odeh | B01D 69/148 |
| 2017/0056839 A1 | 3/2017 | Ho et al. | |
| 2018/0147513 A1 | 5/2018 | Ho et al. | |

FOREIGN PATENT DOCUMENTS

| | | |
|---|---|---|
| CN | 104785122 A | 7/2015 |
| CN | 107847837 A | 3/2018 |
| WO | 2019/040445 A1 | 2/2019 |

OTHER PUBLICATIONS

Y. Chen, B. Wang, L. Zhao, P. Dutta, W.S.W. Ho, New Pebax®/zeolite Y composite membranes for $CO_2$ capture from flue gas, J. Membr. Sci. 495 (2015) 415-423.

W. Yave, A. Car, S.S. Funari, S.P. Nunes, K.-V. Peinemann, $CO_2$-philic polymer membrane with extremely high separation performance, Macromolecules 43 (2009) 326-333.

W. Yave, A. Car, J. Wind, K.-V. Peinemann, Nanometric thin film membranes manufactured on square meter scale: Ultra-thin films for $CO_2$ capture, Nanotechnology 21 (2010)395301.

X. He, M.-B. Hägg, Energy efficient process for $CO_2$ capture from flue gas with novel fixed-site-carrier membranes, Energy Procedia 63 (2014) 174-185.

T.-J. Kim, H. Vrålstad, M. Sandru, M.-B. Hägg, Separation performance of PVAm composite membrane for $CO_2$ capture at various pH levels, J. Membr. Sci. 428 (2013) 218-224.

M. Sandru, S.H. Haukeb, M.-B. Hägg, Composite hollow fiber membranes for $CO_2$ capture, J. Membr. Sci. 346 (2010) 172-186.

Z. Qiao, Z. Wang, S. Yuan, J. Wang, S. Wang, Preparation and characterization of small molecular amine modified PVAm membranes for $CO_2/H_2$ separation, J. Membr. Sci. 475 (2015) 290-302.

Z. Qiao, Z. Wang, C. Zhang, S. Yuan, Y. Zhu, J. Wang, S. Wang, PVAm-PIP/PS composite membrane with high performance for $CO_2/N_2$ separation, AIChE J. 59 (2013) 215-228.

J. Zou, W.S.W. Ho, $CO_2$-selective polymeric membranes containing amines in crosslinked poly(vinyl alcohol), J. Membr. Sci. 286 (2006) 310-321.

J. Huang, J. Zou, W.S.W. Ho, Carbon dioxide capture using a $CO_2$-selective facilitated transport membrane, Ind. Eng. Chem. Res. 47 (2008) 1261-1267.

Y. Chen, W.S.W. Ho, High-molecular-weight polyvinylamine/piperazine glycinate membranes for $CO_2$ capture from flue gas, J. Membr. Sci. (2016) 376-384.

Y. Zhao, B.T. Jung, L. Ansaloni, W.S.W. Ho, Multiwalled carbon nanotube mixed matrix membranes containing amines for high pressure $CO_2/H_2$ separation, J. Memb. Sci. 459 (2014) 233-243.

L. Ansaloni, Y. Zhao, B.T. Jung, K. Ramasubramanian, M.G. Baschetti, W.S.W. Ho, Facilitated transport membranes containing amino-functionalized multi-walled carbon nanotubes for high-pressure $CO_2$ separations, J. Memb. Sci. 490 (2015) 18-28.

D. Wu, L. Zhao, V.K. Vakharia, W. Salim, W.S.W. Ho, Synthesis and characterization of nanoporous polyethersulfone membrane as support for composite membrane in $CO_2$ separation: From lab to pilot scale, J. Membr. Sci., 510 (2016) 58-71.

Y. Chen, L. Zhao, B. Wang, P. Dutta, W.S.W. Ho, Amine-containing polymer/zeolite Y composite membranes for CO2/N2 separation, J. Membr. Sci., 497 (2016) 21-28.

Wilen, Samuel H., André Collet, and Jean Jacques. "Strategies in optical resolutions." Tetrahedron 33.21 (1977): 2725-2736.

Wilen, S.H. Tables of Resolving Agents and Optical Resolutions p. 268 (E.L. Eliel, Ed., Univ. of Notre Dame Press, Notre Dame, IN 1972).

International Preliminary Report on Patentability issued for Application No. PCT/US2019/051308, dated Mar. 25, 2021.

Extended European Search report issued for Application No. 19860928.1, dated May 10, 2022.

Han, Yang, Dongzhu Wu, and WS Winston Ho. "Nanotube-reinforced facilitated transport membrane for CO2/N2 separation with vacuum operation." Journal of Membrane Science 567 (2018): 261-271.

Habibiannejad, S. A., A. Aroujalian, and A. Raisi. "Pebax-1657 mixed matrix membrane containing surface modified multi-walled carbon nanotubes for gas separation." RSC advances 6.83 (2016): 79563-79577.

Nejad, Mahsa Nahavandi, Morteza Asghari, and Morteza Afsari. "Investigation of carbon nanotubes in mixed matrix membranes for gas separation: a review." ChemBioEng Reviews 3.6 (2016): 276-298.

Office Action issued for Chinese Application No. 201980074095.2, dated Mar. 11, 2022.

International Search Report and Written Opinion issued by the International Searching Authority (ISA/US) in PCT Application No. PCT/US2019/051308 dated Nov. 15, 2019. 8 pages.

* cited by examiner

MEMBRANES FOR GAS SEPARATION

CROSS REFERENCE TO RELATED APPLICATIONS

This application is a national stage application filed under 35 U.S.C. § 371 of PCT/US2019/051308 filed Sep. 16, 2019, which claims the benefit of priority to U.S. Provisional Application No. 62/731,790, filed Sep. 14, 2018, which is incorporated by reference herein in its entirety.

STATEMENT REGARDING FEDERALLY FUNDED RESEARCH

This invention was made with government support under grant number DE-FE0026919 awarded by The United States Department of Energy. The government has certain rights in this invention.

BACKGROUND

There are numerous industrial processes that produce gas streams containing carbon dioxide, hydrogen sulfide, and hydrogen chloride, or gas streams containing carbon dioxide, nitrogen oxides, and sulfur oxides. It is often desirable to remove one or more of these gases from the other components of the gas streams, such as hydrogen and nitrogen. Selectively permeable polymeric membranes have been investigated for a variety of gas separation applications, including hydrogen purification and carbon dioxide sequestration. However, there remains a need in the art for membranes, methods of making membranes, and methods of separating gases.

SUMMARY

Disclosed are membranes for gas separation, including amine-containing polymeric membranes that selectively remove $CO_2$ from a $CO_2/N_2$ mixture, e.g., coal or natural gas derived flue gases. The outstanding $CO_2$ flux and $CO_2/N_2$ selectivity is achieve by the reactive diffusion of $CO_2$ through carriers (e.g., the amine carriers). In the selective layer of the membrane, an aminopolymer, serving as the fixed-site carrier, can be used to form the polymer matrix. Aminoacid salts synthesized by reacting a base, e.g., piperazine and 2-(1-piperazinyl)ethylamine, and an aminoacid, e.g., glycine, sarcosine, and 2-aminoisobutyric acid, can be blended with the aminopolymer as mobile carriers. As shown by the examples, these aminoacid salts can serve as effective mobile carriers to enhance the permeation of $CO_2$ through ultrathin membranes at operating temperatures of 57-87° C.

For a practical separation of $CO_2$ from flue gases, a substantial transmembrane pressure differential is often used to provide the driving force for $CO_2$ permeation. Typically, a vacuum is pulled on the downstream side for this purpose. For polymeric membrane materials, proper mechanical properties are required to sustain the vacuum suction. Also described are methods to hydrophilically modify carbon nanotubes (e.g., multi-walled carbon nanotubes, MWNTs) and disperse them in a polymeric selective layer as inorganic reinforcement fillers. As demonstrated in the examples, polymer wrapping by polyvinylpyrrolidone and poly(1-vinylpyrrolidone-co-vinyl acetate) can both effectively eliminate the hydrophobic surface of the MWNTs, which largely enhance the dispersity of MWNTs in the amine-containing selective layer. The MWNTs network reduces the penetration of the selective layer into the nanoporous support under vacuum.

DESCRIPTION OF DRAWINGS

FIG. 3A and FIG. 3B are cross-sections of the membrane without MWNTs before and after vacuum test, respectively.

FIGS. 4A and 4B are cross-sections of the membrane with PVP7-co-Vac3/MWNTs before and after vacuum test, respectively.

FIG. 5A shows these effects under constant feed $CO_2$ concentration and FIG. 5B shows these effects under constant feed $CO_2$ partial pressure of 0.166 atm.

DETAILED DESCRIPTION

Figure 1:
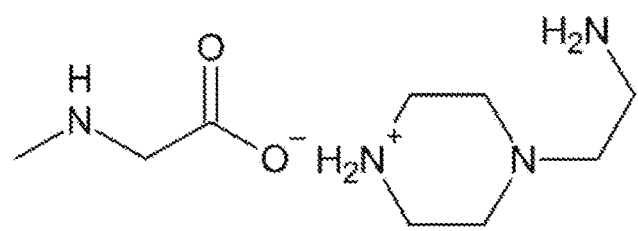
FIG. 1 shows the chemical structure of PZEA-Sar.

Disclosed herein are membranes that comprise a support layer; and a selective polymer layer disposed on (e.g., coated on) the support layer. The selective polymer layer can comprise a selective polymer matrix and carbon nanotubes dispersed within the selective polymer matrix. The carbon nanotubes can be wrapped in a hydrophilic polymer.

Also provided are methods of making these membranes, and methods of using these membranes.

Definitions

As used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points.

For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

In this specification and in the claims which follow, reference will be made to a number of terms which shall be defined to have the following meanings:

"Optional" or "optionally" means that the subsequently described event or circumstance may or may not occur, and that the description includes instances where said event or circumstance occurs and instances where it does not.

The term "n-membered" where n is an integer typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

As used herein, the phrase "optionally substituted" means unsubstituted or substituted. As used herein, the term "substituted" means that a hydrogen atom is removed and replaced by a substituent. It is to be understood that substitution at a given atom is limited by valency.

Throughout the definitions, the term "$C_{n-m}$" indicates a range which includes the endpoints, wherein n and m are integers and indicate the number of carbons. Examples include $C_{1-4}$, $C_{1-6}$, and the like.

As used herein, the term "$C_{n-m}$ alkyl", employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

As used herein, "$C_{n-m}$ alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In some embodiments, the alkenyl moiety contains 2 to 6, 2 to 4, or 2 to 3 carbon atoms.

As used herein, "$C_{n-m}$ alkynyl" refers to an alkyl group having one or more triple carbon-carbon bonds and having n to m carbons. Example alkynyl groups include, but are not limited to, ethynyl, propyn-1-yl, propyn-2-yl, and the like. In some embodiments, the alkynyl moiety contains 2 to 6, 2 to 4, or 2 to 3 carbon atoms.

As used herein, the term "$C_{n-m}$ alkylene", employed alone or in combination with other terms, refers to a divalent alkyl linking group having n to m carbons. Examples of alkylene groups include, but are not limited to, ethan-1,2-diyl, propan-1,3-diyl, propan-1,2-diyl, butan-1,4-diyl, butan-1,3-diyl, butan-1,2-diyl, 2-methyl-propan-1,3-diyl, and the like. In some embodiments, the alkylene moiety contains 2 to 6, 2 to 4, 2 to 3, 1 to 6, 1 to 4, or 1 to 2 carbon atoms.

As used herein, the term "$C_{n-m}$ alkoxy", employed alone or in combination with other terms, refers to a group of formula —O-alkyl, wherein the alkyl group has n to m carbons. Example alkoxy groups include methoxy, ethoxy, propoxy (e.g., n-propoxy and isopropoxy), tert-butoxy, and the like. In some embodiments, the alkyl group has 1 to 6, 1 to 4, or 1 to 3 carbon atoms.

As used herein, the term "$C_{n-m}$ alkylamino" refers to a group of formula —NH(alkyl), wherein the alkyl group has n to m carbon atoms. In some embodiments, the alkyl group has 1 to 6, 1 to 4, or 1 to 3 carbon atoms.

As used herein, the term "$C_{n-m}$ alkoxycarbonyl" refers to a group of formula —C(O)O— alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylcarbonyl" refers to a group of formula —C(O)-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylcarbonylamino" refers to a group of formula —NHC(O)-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylsulfonylamino" refers to a group of formula —NHS(O)$_2$-alkyl, wherein the alkyl group has n to m carbon atoms. In some embodiments, the alkyl group has 1 to 6, 1 to 4, or 1 to 3 carbon atoms.

As used herein, the term "aminosulfonyl" refers to a group of formula —S(O)$_2$NH$_2$.

As used herein, the term "$C_{n-m}$ alkylaminosulfonyl" refers to a group of formula —S(O)$_2$NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminosulfonyl" refers to a group of formula —S(O)$_2$N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "aminosulfonylamino" refers to a group of formula —NHS(O)$_2$NH$_2$.

As used herein, the term "$C_{n-m}$ alkylaminosulfonylamino" refers to a group of formula —NHS(O)$_2$NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminosulfonylamino" refers to a group of formula —NHS(O)$_2$N(alkyl)$_2$, wherein each alkyl group independently has n to m carbon atoms.

In some embodiments, each alkyl group has, independently, 1 to 6, 1 to 4, or 1 to 3 carbon atoms.

As used herein, the term "aminocarbonylamino", employed alone or in combination with other terms, refers to a group of formula —NHC(O)NH$_2$.

As used herein, the term "$C_{n-m}$ alkylaminocarbonylamino" refers to a group of formula —NHC(O)NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminocarbonylamino" refers to a group of formula —NHC(O)N(alkyl)$_2$, wherein each alkyl group independently has n to m carbon atoms.

In some embodiments, each alkyl group has, independently, 1 to 6, 1 to 4, or 1 to 3 carbon atoms.

As used herein, the term "$C_{n-m}$ alkylcarbamyl" refers to a group of formula —C(O)—NH(alkyl), wherein the alkyl group has n to m carbon atoms. In some embodiments, the alkyl group has 1 to 6, 1 to 4, or 1 to 3 carbon atoms.

As used herein, the term "thio" refers to a group of formula —SH.

As used herein, the term "$C_{n-m}$ alkylsulfinyl" refers to a group of formula —S(O)-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylsulfonyl" refers to a group of formula —S(O)$_2$-alkyl, wherein the alkyl group has n to m carbon atoms. In some embodiments, the alkyl group has 1 to 6, 1 to 4, or 1 to 3 carbon atoms.

As used herein, the term "amino" refers to a group of formula —NH$_2$.

As used herein, the term "aryl," employed alone or in combination with other terms, refers to an aromatic hydrocarbon group, which may be monocyclic or polycyclic (e.g., having 2, 3 or 4 fused rings). The term "$C_{n-m}$ aryl" refers to an aryl group having from n to m ring carbon atoms. Aryl groups include, e.g., phenyl, naphthyl, anthracenyl, phenanthrenyl, indanyl, indenyl, and the like. In some embodiments, aryl groups have from 6 to about 20 carbon atoms, from 6 to about 15 carbon atoms, or from 6 to about 10 carbon atoms. In some embodiments, the aryl group is a substituted or unsubstituted phenyl.

As used herein, the term "carbamyl" to a group of formula —C(O)NH$_2$.

As used herein, the term "carbonyl", employed alone or in combination with other terms, refers to a —C(=O)— group, which may also be written as C(O).

As used herein, the term "di($C_{n-m}$-alkyl)amino" refers to a group of formula —N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "di($C_{n-m}$-alkyl)carbamyl" refers to a group of formula —C(O)N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "halo" refers to F, Cl, Br, or I. In some embodiments, a halo is F, Cl, or Br. In some embodiments, a halo is F or Cl.

As used herein, "$C_{n-m}$ haloalkoxy" refers to a group of formula —O-haloalkyl having n to m carbon atoms. An example haloalkoxy group is OCF$_3$. In some embodiments, the haloalkoxy group is fluorinated only. In some embodiments, the alkyl group has 1 to 6, 1 to 4, or 1 to 3 carbon atoms.

As used herein, the term "$C_{n-m}$ haloalkyl", employed alone or in combination with other terms, refers to an alkyl group having from one halogen atom to 2s+1 halogen atoms which may be the same or different, where "s" is the number of carbon atoms in the alkyl group, wherein the alkyl group has n to m carbon atoms. In some embodiments, the haloalkyl group is fluorinated only. In some embodiments, the alkyl group has 1 to 6, 1 to 4, or 1 to 3 carbon atoms.

As used herein, "cycloalkyl" refers to non-aromatic cyclic hydrocarbons including cyclized alkyl and/or alkenyl groups. Cycloalkyl groups can include mono- or polycyclic (e.g., having 2, 3 or 4 fused rings) groups and spirocycles. Cycloalkyl groups can have 3, 4, 5, 6, 7, 8, 9, or 10 ring-forming carbons (C$_{3-10}$). Ring-forming carbon atoms of a cycloalkyl group can be optionally substituted by oxo or sulfido (e.g., C(O) or C(S)). Cycloalkyl groups also include cycloalkylidenes. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, and the like. In some embodiments, cycloalkyl is cyclopropyl, cyclobutyl, cyclopentyl, cyclohexyl, cyclopentyl, or adamantyl. In some embodiments, the cycloalkyl has 6-10 ring-forming carbon atoms. In some embodiments, cycloalkyl is adamantyl. Also included in the definition of cycloalkyl are moieties that have one or more aromatic rings fused (i.e., having a bond in common with) to the cycloalkyl ring, for example, benzo or thienyl derivatives of cyclopentane, cyclohexane, and the like. A cycloalkyl group containing a fused aromatic ring can be attached through any ring-forming atom including a ring-forming atom of the fused aromatic ring.

As used herein, "heteroaryl" refers to a monocyclic or polycyclic aromatic heterocycle having at least one heteroatom ring member selected from sulfur, oxygen, and nitrogen. In some embodiments, the heteroaryl ring has 1, 2, 3, or 4 heteroatom ring members independently selected from nitrogen, sulfur and oxygen. In some embodiments, any ring-forming N in a heteroaryl moiety can be an N-oxide. In some embodiments, the heteroaryl has 5-10 ring atoms and 1, 2, 3 or 4 heteroatom ring members independently selected from nitrogen, sulfur and oxygen. In some embodiments, the heteroaryl has 5-6 ring atoms and 1 or 2 heteroatom ring members independently selected from nitrogen, sulfur and oxygen. In some embodiments, the heteroaryl is a five-membered or six-membered heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl and pyridazinyl.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, and 7-membered heterocycloalkyl groups. Heterocycloalkyl groups can also include spirocycles. Example heterocycloalkyl groups include pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by oxo or sulfido (e.g., C(O), S(O), C(S), or S(O)$_2$, etc.). The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. Also included in the definition of heterocycloalkyl are moieties that have one or more aromatic rings fused (i.e., having a bond in common with) to the cycloalkyl ring, for example, benzo or thienyl derivatives of piperidine, morpholine, azepine, etc. A heterocycloalkyl group containing a fused aromatic ring can be attached through any ring-forming atom including a ring-forming atom of the fused aromatic ring. In some embodiments, the heterocycloalkyl has 4-10, 4-7 or 4-6 ring atoms with 1 or 2 heteroatoms independently selected from nitrogen, oxygen, or sulfur and having one or more oxidized ring members.

At certain places, the definitions or embodiments refer to specific rings (e.g., an azetidine ring, a pyridine ring, etc.). Unless otherwise indicated, these rings can be attached to any ring member provided that the valency of the atom is not exceeded. For example, an azetidine ring may be attached at any position of the ring, whereas a pyridin-3-yl ring is attached at the 3-position.

The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

Compounds provided herein also include tautomeric forms. Tautomeric forms result from the swapping of a single bond with an adjacent double bond together with the concomitant migration of a proton. Tautomeric forms include prototropic tautomers which are isomeric protonation states having the same empirical formula and total charge. Example prototropic tautomers include ketone—enol pairs, amide—imidic acid pairs, lactam—lactim pairs, enamine—imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

In some embodiments, the compounds described herein can contain one or more asymmetric centers and thus occur as racemates and racemic mixtures, enantiomerically enriched mixtures, single enantiomers, individual diastereomers and diastereomeric mixtures (e.g., including (R)- and (S)-enantiomers, diastereomers, (D)-isomers, (L)-isomers, (+) (dextrorotatory) forms, (−) (levorotatory) forms, the racemic mixtures thereof, and other mixtures thereof). Additional asymmetric carbon atoms can be present in a substituent, such as an alkyl group. All such isomeric forms, as well as mixtures thereof, of these compounds are expressly included in the present description. The compounds described herein can also or further contain linkages wherein bond rotation is restricted about that particular linkage, e.g. restriction resulting from the presence of a ring or double bond (e.g., carbon-carbon bonds, carbon-nitrogen bonds such as amide bonds). Accordingly, all cis/trans and E/Z isomers and rotational isomers are expressly included in the present description. Unless otherwise mentioned or indicated, the chemical designation of a compound encompasses the mixture of all possible stereochemically isomeric forms of that compound.

Optical isomers can be obtained in pure form by standard procedures known to those skilled in the art, and include, but are not limited to, diastereomeric salt formation, kinetic resolution, and asymmetric synthesis. See, for example, Jacques, et al., Enantiomers, Racemates and Resolutions (Wiley Interscience, New York, 1981); Wilen, S. H., et al., Tetrahedron 33:2725 (1977); Eliel, E. L. Stereochemistry of Carbon Compounds (McGraw-Hill, N Y, 1962); Wilen, S. H. Tables of Resolving Agents and Optical Resolutions p. 268 (E. L. Eliel, Ed., Univ. of Notre Dame Press, Notre Dame, Ind. 1972), each of which is incorporated herein by reference in their entireties. It is also understood that the compounds described herein include all possible regioisomers, and mixtures thereof, which can be obtained in pure form by standard separation procedures known to those skilled in the art, and include, but are not limited to, column chromatography, thin-layer chromatography, and high-performance liquid chromatography.

Support Layer

The support layer can be formed from any suitable material. The material used to form the support layer can be chosen based on the end use application of the membrane. In some embodiments, the support layer can comprise a gas permeable polymer. The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, nitrile-based polymers, polymeric organosilicones, fluorinated polymers, polyolefins, copolymers thereof, or blends thereof. Specific examples of polymers that can be present in the support layer include polydimethylsiloxane, polydiethylsiloxane, polydi-iso-propylsiloxane, polydiphenylsiloxane, polyethersulfone, polyphenylsulfone, polysulfone, polyacrylonitrile, polyvinylidene fluoride, polyamide, polyimide, polyetherimide, polyetheretherketone, polyphenylene oxide, polybenzimidazole, polypropylene, polyethylene, partially fluorinated, perfluorinated or sulfonated derivatives thereof, copolymers thereof, or blends thereof. In some embodiments, the gas permeable polymer can be polysulfone or polyethersulfone. If desired, the support layer can include inorganic particles to increase the mechanical strength without altering the permeability of the support layer.

In certain embodiments, the support layer can comprise a gas permeable polymer disposed on a base. The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester).

Selective Polymer Layer

The selective polymer layer can comprise a selective polymer matrix and carbon nanotubes dispersed within the selective polymer matric. The carbon nanotubes can be wrapped in a hydrophilic polymer.

The selective polymer matrix can comprise a hydrophilic polymer, an amine-containing polymer, or a combination thereof. Optionally, the selective polymer matrix can further comprise additional components, such as an amine-based mobile carrier (e.g., a low molecular weight amino compound) dispersed within the polymer matrix. By way of example, in some embodiments, the selective polymer layer can comprise an amine-containing polymer (e.g., polyvinylamine), a hydrophilic polymer (e.g., polyvinyl alcohol), and an amine-based mobile carrier (e.g., PZEA-Sar, PZEA-AIBA, HEP, or a combination thereof).

In some cases, the selective polymer layer can be a polymer matrix through which gas permeates via diffusion or facilitated diffusion. The selective polymer layer can comprise a polymer matrix having a $CO_2:N_2$ selectivity of at least 10 at 57° C. and 1 atm feed pressure. For example, the polymer matrix can have a $CO_2:N_2$ selectivity of at least 25 (e.g., at least 50, at least 75, at least 100, at least 125, at least 150, at least 175, at least 200, at least 225, at least 250, at least 275, at least 300, at least 325, at least 350, at least 375, at least 400, at least 425, at least 450, or at least 475) at 57° C. and 1 atm feed pressure. In some embodiments, the polymer matrix can have a $CO_2:N_2$ selectivity of 500 or less (e.g., 475 or less, 450 or less, 425 or less, 400 or less, 375 or less, 350 or less, 325 or less, 300 or less, 275 or less, 250 or less, 225 or less, 200 or less, 175 or less, 150 or less, 125 or less, 100 or less, 75 or less, 50 or less, or 25 or less) at 57° C. and 1 atm feed pressure.

In certain embodiments, the selective polymer layer can comprise a polymer matrix that has a $CO_2:N_2$ selectivity ranging from any of the minimum values described above to any of the maximum values described above. For example, in certain embodiments, the selective polymer layer can comprise a polymer matrix that has a $CO_2:N_2$ selectivity of from 10 to 500 at 57° C. and 1 atm feed pressure (e.g., from 10 to 400 at 57° C. and 1 atm feed pressure, from 75 to 400 at 57° C. and 1 atm feed pressure, from 100 to 400 at 57° C. and 1 atm feed pressure, from 10 to 350 at 57° C. and 1 atm feed pressure, from 75 to 350 at 57° C. and 1 atm feed pressure, from 100 to 350 at 57° C. and 1 atm feed pressure, from 10 to 250 at 57° C. and 1 atm feed pressure, from 75 to 250 at 57° C. and 1 atm feed pressure, or from 100 to 250 at 57° C. and 1 atm feed pressure). The $CO_2:N_2$ selectivity of the selective polymer can be measured using standard methods for measuring gas permeance known in the art, such as those described in the examples below.

If desired, the selective polymer layer can be surface modified by, for example, chemical grafting, blending, or coating to improve the performance of the selective polymer layer. For example, hydrophobic components may be added to the selective polymer layer to alter the properties of the selective polymer layer in a manner that facilitates greater fluid selectivity.

The total thickness of each layer in the membrane can be chosen such that the structure is mechanically robust, but not so thick as to impair permeability. In some embodiments, the selective polymer layer can have a thickness of from 50 nanometers to 5 microns (e.g., from 50 nm to 2 microns, or from 100 nanometers to 750 nanometers, or from 250 nanometers to 500 nanometers). In some embodiments, the support layer can have a thickness of from 1 micron to 500 microns (e.g., from 50 to 250 microns). In some cases, the membranes disclosed herein can have a thickness of from 5 microns to 500 microns.

Selective Polymer Matrix

The selective polymer matrix can include a hydrophilic polymer, an amine-containing polymer, or a combination thereof. In certain embodiments, the selective polymer matrix can include a hydrophilic polymer. In certain embodiments, the selective polymer matrix can include an amine-containing polymer. In certain embodiments, the selective polymer matrix can include a hydrophilic polymer and an amine-containing polymer.

When present, the hydrophilic polymer can include any suitable hydrophilic polymer. Examples of hydrophilic polymers suitable for use in the selective polymer layer can include polyvinylalcohol, polyvinylacetate, polyethylene oxide, polyvinylpyrrolidone, polyacrylamine, a polyamine such as polyallylamine, polyvinyl amine, or polyethylenimine, copolymers thereof, and blends thereof. In some embodiments, the hydrophilic polymer includes polyvinylalcohol.

When present, the hydrophilic polymer can have any suitable molecular weight. For example, the hydrophilic polymer can have a weight average molecular weight of from 15,000 Da to 2,000,000 Da (e.g., from 50,000 Da to 200,000 Da). In some embodiments, the hydrophilic polymer can include polyvinylalcohol having a weight average molecular weight of from 50,000 Da to 150,000 Da. In other embodiments, the hydrophilic polymer can be a high molecular weight hydrophilic polymer. For example, the hydrophilic polymer can have a weight average molecular weight of at least 500,000 Da (e.g., at least 700,000 Da, or at least 1,000,000 Da).

The selective polymer matrix can comprise any suitable amount of the hydrophilic polymer. For example, in some cases, the selective polymer matrix can comprise from 10% to 90% by weight (e.g., from 10% to 50% by weight, or from 10% to 30% by weight) hydrophilic polymer, based on the total weight of the components used to form the selective polymer matrix.

The selective polymer matrix can also include an amine-containing polymer (also referred to herein as a "fixed carrier"). When present, the amine-containing polymer can have any suitable molecular weight. For example, the amine-containing polymer can have a weight average molecular weight of from 5,000 Da to 5,000,000 Da, or from 50,000 Da to 2,000,000 Da.

Suitable examples of amine-containing polymers include, but are not limited to, polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof. In some embodiments, the amine-containing polymer can comprise polyvinylamine (e.g., polyvinylamine having a weight average molecular weight of from 50,000 Da to 2,000,000 Da).

The selective polymer matrix can comprise any suitable amount of the amine-containing polymer. For example, in some cases, the selective polymer matrix can comprise from 10% to 90% by weight (e.g., from 10% to 50% by weight, or from 10% to 30% by weight) amine-containing polymer, based on the total weight of the components used to form the selective polymer matrix.

Amine-Containing Mobile Carrier

Suitable amine-containing mobile carriers can include small molecules comprising one or more primary amine moieties and/or one or more secondary amine moieties, such as an amino acid salt, that can serve as a "mobile carrier" for $CO_2$ within the polymer matrix.

In some embodiments, the amine-containing mobile carrier can have a molecular weight of 1,000 Da or less (e.g., 800 Da or less, 500 or less, 300 Da or less, or 250 Da or less). In some embodiments, the amine-containing mobile carrier can be non-volatile at the temperatures at which the membrane will be stored or used. For example, amine-containing mobile carrier can comprise a salt of a primary amine or a salt of a secondary amine.

In some cases, the amine-containing mobile carrier can include an ammoacid salt. The amino acid salt can be a salt of any suitable amino acid. The amino acid salt may be derived, for instance, from glycine, arginine, lysine, histidine, 6-aminohexanoic acid, proline, sarcosine, methionine, or taurine. In some cases, the amino acid salt can comprise a salt of a compound defined by the formula below

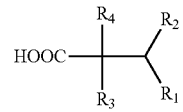

Wherein, independently for each occurrence in the amino acid, each of $R_1$, $R_2$, $R_3$ and $R_4$ is selected from one of the following

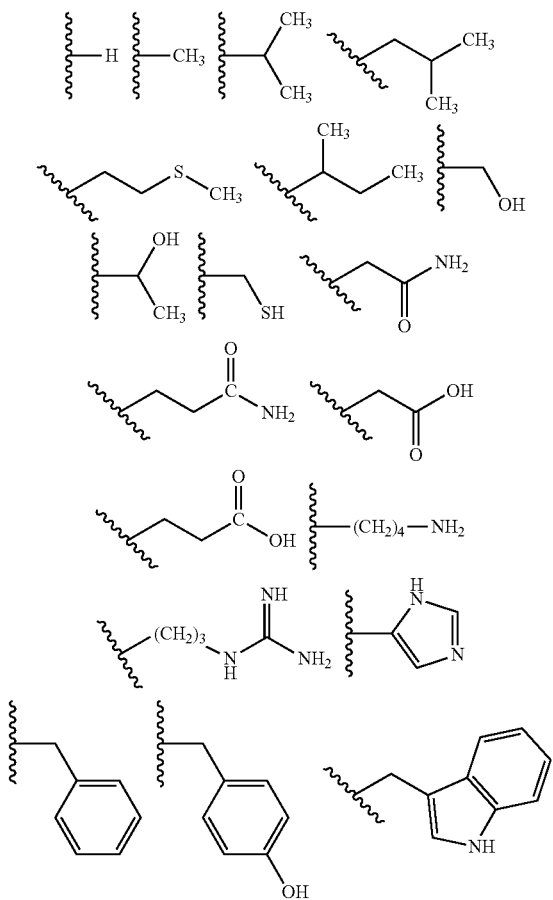

or $R_1$ and $R_3$, together with the atoms to which they are attached, form a five-membered heterocycle defined by the structure below when n is 1, or a six-membered heterocycle defined by the structure below when n is 2

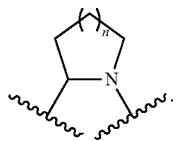

Poly(amino-acids), for example, polyarginine, polylysine, polyonithine, or polyhistidine may also be used to prepare the amino acid salt.

In other embodiments, the amine-containing mobile carrier can be defined by a formula below

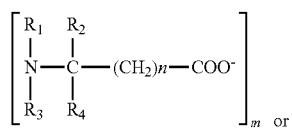

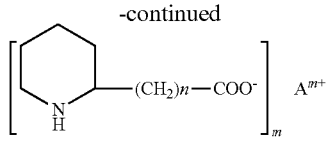

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3. In some cases, the cation ($A^{m+}$) can be an amine cation having the formula:

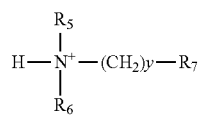

wherein $R_5$ and $R_6$, are hydrogen or hydrocarbon groups having from 1 to 4 carbon atoms, $R_7$ is hydrogen or hydrocarbon groups having from 1 to 4 carbon atoms or an alkyl amine of from 2 to 6 carbon atoms and 1 to 4 nitrogen atoms, y is an integer ranging from 1 to 4, and m is an integer equal to the valence of the cation. In some embodiments, $A^{m+}$ is a metal cation selected from Groups Ia, IIa, and IIIa of the Periodic Table of Elements or a transition metal. For example, $A^{m+}$ can comprise lithium, aluminum, or iron.

Other suitable amine-containing mobile carriers include aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperadine-2-carboxlic acid-potassium salt, piperadine-2-carboxlic acid-lithium salt, piperadine-2-carboxlic acid-piperazine salt, piperadine-4-carboxlic acid-potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

Other Components

In some embodiments, the selective polymer matrix can further include a cross-linking agent. Cross-linking agents suitable for use in the polymer matrix can include, but are not limited to, formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof. In some embodiments, the cross-linking agent can comprise formaldehyde, glutaraldehyde, or maleic anhydride. The selective polymer matrix can comprise any suitable amount of the cross-linking agent. For example, the polymer matrix can comprise 1 to 40 percent cross-linking agents by weight of the polymer matrix.

The selective polymer matrix can further include a base. The base can act as a catalyst to catalyze the cross-linking of the polymer matrix (e.g., cross-linking of a hydrophilic polymer with an amine-containing polymer). In some embodiments, the base can remain in the polymer matrix and constitute a part of the polymer matrix. Examples of suitable bases include potassium hydroxide, sodium hydroxide, lithium hydroxide, triethylamine, dimethylaminopyridine, hexamethyltriethylenetetraamine, potassium carbonate, sodium carbonate, lithium carbonate, and combinations thereof. In some embodiments, the base can include potassium hydroxide. The polymer matrix can comprise any suitable amount of the base. For example, the polymer matrix can comprise 1 to 40 percent base by weight of the polymer matrix.

Carbon Nanotubes

The selective polymer layer can comprise carbon nanotubes dispersed within the selective polymer matric. The carbon nanotubes can be wrapped in a hydrophilic polymer.

Any suitable carbon nanotubes (prepared by any suitable method or obtained from a commercial source) can be used. The carbon nanotubes can comprise single-walled carbon nanotubes, multiwalled carbon nanotubes, or a combination thereof.

In some cases, the carbon nanotubes can have an average diameter of a least 10 nm (e.g., at least 20 nm, at least 30 nm, or at least 40 nm). In some cases, the carbon nanotubes can have an average diameter of 50 nm or less (e.g., 40 nm or less, 30 nm or less, or 20 nm or less). In certain embodiments, the carbon nanotubes can have an average diameter ranging from any of the minimum values described above to any of the maximum values described above. For example, the carbon nanotubes can have an average diameter of from 10 nm to 50 nm (e.g., from 10 nm to 30 nm, or from 20 nm to 50 nm).

In some cases, the carbon nanotubes can have an average length of at least 50 nm (e.g., at least 100 nm, at least 200 nm, at least 300 nm, at least 400 nm, at least 500 nm, at least 600 nm, at least 700 nm, at least 800 nm, at least 900 nm, at least 1 µm, at least 5 µm, at least 10 µm, or at least 15 µm). In some cases, the carbon nanotubes can have an average length of 20 µm or less (e.g., 15 µm or less, 10 µm or less, 5 µm or less, 1 µm or less, 900 nm or less, 800 nm or less, 700 nm or less, 600 nm or less, 500 nm or less, 400 nm or less, 300 nm or less, 200 nm or less, or 100 nm or less).

In certain embodiments, the carbon nanotubes can have an average length ranging from any of the minimum values described above to any of the maximum values described above. For example, the carbon nanotubes can have an average length of from 50 nm to 20 µm (e.g., from 200 nm to 20 µm, or from 500 nm to 10 µm).

In some cases, the carbon nanotubes can comprise unfunctionalized carbon nanotubes. In other embodiments, the carbon nanotubes can comprise sidewall functionalized carbon nanotubes. Sidewall functionalized carbon nanotubes are well known in the art. Suitable sidewall functionalized carbon nanotubes can be prepared from unfunctionalized carbon nanotubes, for example, by creating defects on the sidewall by strong acid oxidation. The defects created by the oxidant can subsequently converted to more stable hydroxyl and carboxylic acid groups. The hydroxyl and carboxylic acid groups on the acid treated carbon nanotubes can then coupled to reagents containing other functional groups (e.g., amine-containing reagents), thereby introducing pendant functional groups (e.g., amino groups) on the sidewalls of the carbon nanotubes. In some embodiments, the carbon nanotubes can comprise hydroxy-functionalized carbon nanotubes, carboxy-functionalized carbon nanotubes, amine-functionalized carbon nanotubes, or a combination thereof.

In some embodiments, the selective polymer layer can comprise at least 0.5% (e.g., at least 1%, at least 1.5%, at least 2%, at least 2.5%, at least 3%, at least 3.5%, at least 4%, or at least 4.5%) by weight carbon nanotubes, based on the total dry weight of the selective polymer layer. In some embodiments, the selective polymer layer can comprise 5% or less (e.g., 4.5% or less, 4% or less, 3.5% or less, 3% or less, 2.5% or less, 2% or less, 1.5% or less, or 1% or less) by weight carbon nanotubes, based on the total dry weight of the selective polymer layer.

The selective polymer layer can comprise an amount of carbon nanotubes ranging from any of the minimum values described above to any of the maximum values described above. For example, the selective polymer layer can comprise from 0.5% to 5% (e.g., from 1% to 3%) by weight carbon nanotubes, based on the total dry weight of the selective polymer layer.

The hydrophilic polymer can include any suitable hydrophilic polymer. Examples of hydrophilic polymers suitable for use in the selective polymer layer can include polyvinylalcohol, polyvinylacetate, polyethylene oxide, polyvinylpyrrolidone, polyacrylamine, a polyamine such as polyallylamine, polyvinyl amine, or polyethylenimine, copolymers thereof, and blends thereof. In some embodiments, the hydrophilic polymer can have a weight average molecular weight of from 15,000 Da to 2,000,000 Da (e.g., from 50,000 Da to 200,000 Da). In some embodiments, the hydrophilic polymer can comprise polyvinylpyrrolidone or poly(1-vinylpyrrolidone-co-vinyl acetate).

Methods of Making

Methods of making these membranes are also disclosed herein. Methods of making membranes can include depositing a selective polymer layer on a support layer to form a selective layer disposed on the support layer. The selective polymer layer can comprise a selective polymer matrix and carbon nanotubes dispersed within the selective polymer matrix.

Optionally, the support layer can be pretreated prior to deposition of the selective polymer layer, for example, to remove water or other adsorbed species using methods appropriate to the support and the adsorbate. Examples of absorbed species are, for example, water, alcohols, porogens, and surfactant templates.

The selective polymer layer can be prepared by first forming a coating solution including the components of the selective polymer matrix (e.g., a hydrophilic polymer, an amine-containing polymer, or a combination thereof), the carbon nanotubes wrapped in a hydrophilic polymer, and optionally one or more additional components (e.g., an amine-based mobile carrier, a cross-linking agent, a basic compound, or a combination thereof) in a suitable solvent. One example of a suitable solvent is water. In some embodiments, the amount of water employed will be in the range of from 50% to 99%, by weight of the coating solution. The coating solution can then be used in forming the selective polymer layer. For example, the coating solution can be coated onto a support later (e.g., a nanoporous gas permeable membrane) using any suitable technique, and the solvent may be evaporated such that a nonporous membrane is formed on the substrate. Examples of suitable coating techniques include, but are not limited to, "knife coating" or "dip coating". Knife coating include a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. Dip coating include a process in which a polymer solution is contacted with a porous support. Excess solution is permitted to drain from the support, and the solvent of the polymer solution is evaporated at ambient or elevated temperatures. The membranes disclosed can be shaped in the form of hollow fibers, tubes, films, sheets, etc. In certain embodiments, the membrane can be configured in a flat sheet, a spiral-wound, a hollow fiber, or a plate-and-frame configuration.

In some embodiments, the membranes can be heated at a temperature and for a time sufficient for cross-linking to occur. In one example, cross-linking temperatures in the range from 80° C. to 100° C. can be employed. In another example, cross-linking can occur from 1 to 72 hours. The resulting solution can be coated onto the support layer and the solvent evaporated, as discussed above. In some embodiments, a higher degree of cross-linking for the polymer matrix after solvent removal takes place at about 100° C. to about 180° C., and the cross-linking occurs in from about 1 to about 72 hours.

An additive may be included in the selective polymer layer before forming the selective polymer layer to increase the water retention ability of the membrane. Suitable additives include, but are not limited to, polystyrenesulfonic acid-potassium salt, polystyrenesulfonic acid-sodium salt, polystyrenesulfonic acid-lithium salt, sulfonated polyphenyleneoxides, alum, and combinations thereof. In one example, the additive comprises polystyrenesulfonic acid-potassium salt.

In some embodiments, the method of making these membranes can be scaled to industrial levels.

Methods of Use

The membranes disclosed herein can be used for separating gaseous mixtures. For example, provided are methods for separating a first gas from a feed gas comprising the first gas and one or more additional gases (e.g., at least a second gas). The method can include contacting any of the disclosed membranes (e.g., on the side comprising the selective polymer) with the feed gas under conditions effective to afford transmembrane permeation of the first gas. In some embodiments, the method can also include withdrawing from the reverse side of the membrane a permeate containing at least the first gas, wherein the first gas is selectively removed from the gaseous stream. The permeate can comprise at least the first gas in an increased concentration relative to the feed stream. The term "permeate" refers to a portion of the feed stream which is withdrawn at the reverse or second side of the membrane, exclusive of other fluids such as a sweep gas or liquid which may be present at the second side of the membrane.

The membrane can be used to separate fluids at any suitable temperature, including temperatures of 100° C. or greater. For example, in some embodiments, the feed gas can have a temperature of from 25° C. to 100° C. In other embodiments, the feed gas can have a temperature of from 100° C. to 180° C. In some embodiments, a vacuum can be applied to the permeate face of the membrane to remove the first gas. In some embodiments, a sweep gas can be flowed across the permeate face of the membrane to remove the first gas. Any suitable sweep gas can be used. Examples of suitable sweep gases include, for example, air, steam, nitrogen, argon, helium, and combinations thereof.

The first gas can include an acid gas. For example, the first gas can be carbon dioxide, hydrogen sulfide, hydrochloric acid, sulfur dioxide, sulfur trioxide, nitrogen oxide, or combinations thereof. In some embodiments, the membrane can be selective to carbon dioxide versus hydrogen, nitrogen, carbon monoxide, or combinations thereof. In some embodiments, the membrane can be selective to hydrogen sulfide versus hydrogen, nitrogen, carbon monoxide, or combinations thereof. In some embodiments, the membrane can be selective to hydrochloric acid gas versus hydrogen, nitrogen, carbon monoxide, or combinations thereof.

In certain embodiments, the first gas can comprise carbon dioxide and the second gas can comprise hydrogen. In certain embodiments, the first gas can comprise carbon dioxide and the second gas can comprise nitrogen.

The permeance of the first gas or the acid gas can be at least 50 GPU (e.g., 75 GPU or greater, 100 GPU or greater, 150 GPU or greater, 200 GPU or greater, 250 GPU or greater, 300 GPU or greater, 350 GPU or greater, 400 GPU or greater, 450 GPU or greater, 500 GPU or greater, 550 GPU or greater, 600 GPU or greater, 650 GPU or greater, 700 GPU or greater, 750 GPU or greater, 800 GPU or greater, 850 GPU or greater, 900 GPU or greater, 950 GPU or greater, 1000 GPU or greater, 1100 GPU or greater, 1200 GPU or greater, 1300 GPU or greater, or 1400 GPU or greater) at 57° C. and 1 atm feed pressure.

The permeance of the first gas or the acid gas can be 1500 GPU or less at 57° C. and 1 atm feed pressure (e.g., 1400 GPU or less, 1300 GPU or less, 1200 GPU or less, 1100 GPU or less, 1000 GPU or less, 950 GPU or less, 900 GPU or less, 850 GPU or less, 800 GPU or less, 750 GPU or less, 700 GPU or less, 650 GPU or less, 600 GPU or less, 550 GPU or less, 500 GPU or less, 450 GPU or less, 400 GPU or less, 350 GPU or less, 300 GPU or less, 250 GPU or less, 200 GPU or less, 150 GPU or less, 100 GPU or less, or 75 GPU or less).

The permeance of the first gas or the acid gas through the membrane can vary from any of the minimum values described above to any of the maximum values described above. For example, the permeance of the first gas or the acid gas can be from 50 GPU to 1500 GPU at 57° C. and 1 atm feed pressure (e.g., from 300 GPU to 1500 GPU at 120° C., or from 500 GPU to 1500 GPU at 57° C. and 1 atm feed pressure).

The membrane can exhibit a first gas/second gas selectivity of at least 20 at 57° C. and 1 at feed pressure. In some embodiments, the membrane can exhibit a first gas/second gas selectivity of up to 300 at 57° C. and 1 atm feed pressure. For example, the membrane can exhibit a first gas/second gas selectivity of 25 or greater, 50 or greater, 75 or greater, 100 or greater, 125 or greater, 150 or greater, 175 or greater, 200 or greater, 225 or greater, 250 or greater, or 275 or greater at 57° C. and 1 atm feed pressure. In some embodiments, the permeance and selectivity of the membrane for the first gas or the acid gas can vary at higher or lower temperatures.

By way of non-limiting illustration, examples of certain embodiments of the present disclosure are given below.

EXAMPLES

Example 1: Nanotube-Reinforced Membrane for $Co_2/N_2$ Separation with Vacuum Operation Abstract This example describes a membrane containing multi-walled carbon nanotubes (MWNTs) in an amine-containing polymeric matrix for $CO_2/N_2$ separation with a vacuum pulled on the permeate side. The polymeric selective layer, coated on top of a highly permeable nanoporous support, comprises an aminoacid salt as the mobile carrier in a polyamine matrix as the fixed-site carrier to facilitate the transport of $CO_2$. Polymer-wrapped MWNTs are incorporated in the polymeric selective layer as rigid inorganic fillers. Both polyvinylpyrrolidone and poly(1-vinylpyrrolidone-co-vinyl acetate) can effectively wrap on the hydrophobic surface of the MWNTs to enhance the dispersion of the polymer-wrapped MWNTs in the amine-containing selective layer. The polymer-wrapped MWNTs overcome the penetration of the selective layer into the nanoporous support under vacuum, and the MWNTs also mitigate the membrane compaction if the feed gas is compressed. These membranes are also applicable to $CO_2/N_2$ separation using a sweep gas on the permeate side.

Background

There has been growing concern about global warming since the $CO_2$ concentration in the atmosphere has surpassed 400 ppm in the past decade. The combustion of fossil fuels is one of the major contributors to the large amount of $CO_2$ emission. Membrane technology has been suggested as a promising approach to capture $CO_2$ from large stationary sources (e.g., flue gases from coal-fired and natural gas-fired power plants), followed by compression for geological sequestration or enhanced oil recovery. Multiple research efforts have been dedicated in designing membrane processes that can capture 90% $CO_2$ from the power plant flue gases with a $CO_2$ purity of at least 95%. U.S. Pat. No. 7,964,020 [1] discloses a membrane gas separation process in which the $CO_2$ is enriched by a vacuum membrane stage then followed by a cryogenic distillation unit for further $CO_2$ enrichment. U.S. Pat. No. 9,216,390 [2] discloses a membrane process that can enrich $CO_2$ to 95% purity by a vacuum membrane stage where further purification of the downstream $CO_2$ is not needed. A common element in these two examples is a vacuum membrane stage where a vacuum of 0.2 atm is pulled on the permeate side of the membrane to provide the transmembrane driving force. In this case, the membrane is subject to a pressure differential from the feed to the permeate side. Although various membrane materials have been developed to minimize the $CO_2$ capture cost based on the two aforementioned membrane processes, the membrane performances, in terms of $CO_2$ permeance and $CO_2/N_2$ selectivity, were seldom measured under the vacuum operation mode. Sandru et al. [3] indeed characterized their membrane performance by pulling a vacuum; however, the $CO_2$ permeance under vacuum was only one half of the one obtained by using a sweep gas on the permeate side. Zhao et al. [4] and Ansaloni et al. [5] used multiwalled carbon nanotubes incorporated in a polymeric membrane as mechanical reinforcing fillers to tackle the polymer compaction caused by the feed-to-permeate pressure differential. The feed-to-permeate pressure differential in the present example, however, is caused by pulling a vacuum on the permeate side, instead of pressurizing the feed gases as in References [4] and [5]. The polymeric membrane this example is an extension of the amine-containing composite membrane developed by Chen et al. [6], that is, polyvinylamine (PVAm) is employed as the polymer matrix; however, a new aminoacid salt, e.g., 2-(1-piperazinyl)ethylamine sarcosinate (PZEA-Sar), was incorporated as the mobile carrier for $CO_2$ transport. The membrane transport properties were measured using a sweep gas on the permeate side. It will be shown in the following examples that the vacuum on the permeate side will lead to a penetration of the selective layer into the nanoporous substrate, thereby a deteriorated membrane performance. One approach to mitigate this penetration is to disperse multi-walled carbon nanotubes (MWNTs) into the polymer matrix as reinforcement nanofillers. However, pristine MWNTs were found incompatible with PVAm due to their hydrophobic nature. The viscosity of the polymer solution drastically reduced even at a very low MWNT loading, which caused difficulties in membrane coating for an ultra-thin selective layer. It will be shown that polyvinylpyrrolidone (PVP)-based polymers can effectively wrap on the hydrophobic surface of the MWNTs, thus an improved dispersity in PVAm. It will also be shown that the mechanical strength of the polymeric selective layer can be enhanced by the MWNTs at large feed-to-permeate pressure differential.

Materials and Methods 2-(1-piperazinyl)ethylamine (PZEA, 99%), sarcosine (Sar, 98%), sodium dodecyl sulfate (SDS, 99%), and polyvinylpyrrolidone (PVP, 360 kDa) were purchased from Sigma-Aldrich (Milwaukee, Wis.). Poly(1-vinylpyrrolidone-co-vinyl acetate) (PVP3-co-VAc7, 3:7 mole ratio of VP:VAc, 50% in ethanol) was purchased from Fisher Scientific Inc. (Pittsburgh, Pa.). Poly(1-vinylpyrrolidone-co-vinyl acetate) (PVP7-co-VAc3, 7:3 mole ratio of VP:VAc, 50% in ethanol) was purchased from VWR International (Radnor, Pa.). MWNTs were provided in powder form by Arkema Inc. (Philadelphia, Pa.) under the name Graphistrength® C100 (0.1-10 μm length, 10-15 nm diameter, 5-12 walls). The powder contained 90 wt. % MWNTs, 6 wt. % catalyst, and 4 wt. % moisture. All the chemicals were used as received without further purification. For gas permeation measurements, pre-purified $CO_2$ and argon were purchased from Praxair Inc. (Danbury, Conn.).

In terms of the amine-containing polymer, it can be, but is not limited to, amine polymers such as polyvinylamine (PVAm), polyallylamine, polyethyleneimine, copolymers, and blends thereof. The amine-containing polymer employed in the invention is PVAm purified from a commercial product named Polymin® VX from BASF (Vandalia, Ill.). The PVAm has a high weight average molecular weight of 2,000 kDa. The amine-containing polymer can have a weight average molecular weight of from 300 to 10,000 kDa, but preferably to be higher than 1000 kDa.

In certain embodiments, amino acid salts are blended in the amine-containing polymer to further facilitate the $CO_2$ transport. It can be the salt of any amino acid, although 2-(1-piperazinyl)ethylamine sarcosinate is used as illustration in this example.

Polymer Wrapping of MWNTs

Polymer-wrapped MWNTs were prepared by suspending the MWNT powder in 1 wt. % SDS aqueous solution at a MWNT content of 100 μg/mL in a 45-mL conical centrifuge tube. This suspension was sonicated for 30 min by a sonication probe (Branson Sonifier® SFX 150, Danbury, Conn., 150 W output power) cooled by an ice bath. A ⅛" Microtip probe at 70% amplitude was used to prevent tube damage. PVP, PVP7-co-VAc3, or PVP3-co-VAc7 was added in the dispersion to result in a 1 wt. % mixture, which was incubated at 50° C. for 16 h. The resultant mixture was centrifuged at 20,000×g for 1 h (Eppendorf 5806, Westbury, N.Y.), forming a gelatinous pellet. The pellet was collected and dispersed in RO (reverse osmosis) water at a concentration of 0.1 wt. % by the sonication probe for 10 min, then centrifuged again. This centrifugation-dispersion cycle was repeated for 5 times to remove the excess, residual polymer and SDS. After the last centrifugation, the polymer-wrapped MWNTs could form stable dispersion up to 1 wt. %.

Coating Solution and Membrane Preparation

The MWNT-reinforced composite membranes were synthesized by the following steps. Firstly, the purified PVAm solution was concentrated to 4 wt. % by evaporating water under $N_2$ purge at 50° C. Polymer-wrapped MNWTs dispersion with a concentration of 1 wt. % was added dropwise to the concentrated PVAm solution by a 10-4, glass capillary tube under vigorous agitation, aiming for 0-6 wt. % MWNT loading in the final total solid of the coating solution. The mixture was transferred to a 15-mL conical centrifuge tube, in which it was homogenized by the 1/8" Microtip sonication probe with a 50% amplitude until uniformly dispersed. The sonication was carried out in an ice bath.

The aminoacid salt mobile carrier, PZEA-Sar, was synthesized by reacting the base, PZEA, with the aminoacid, Sar. The stoichiometric amount of Sar was added in a 24 wt. % PZEA aqueous solution under vigorous mixing. The solution was mixed at room temperature for 2 h before use. The chemical structure of PZEA-Sar is shown in FIG. 1.

A certain amount of PZEA-Sar solution was incorporated in the dispersion to form the coating solution. After centrifugation at 8,000×g for 3 min to remove any air bubbles, the coating solution was coated on a nanoporous polyethersulfone (PES) substrate by a GARDCO adjustable micrometer film applicator (Paul N. Gardner Company, Pompano Beach, Fla.) with a controlled gap setting. The PES substrate was synthesized in house with a surface average pore size of 32 nm [7]. Ideally, the coating solution should have a viscosity >1100 cp at a total solid content of <15 wt. % in order to form a defect-free selective layer with a thickness ca. 170 nm. The membrane was dried in a fume hood at room temperature for at least 6 h before testing.

Gas Permeation Measurements

Figure 2:
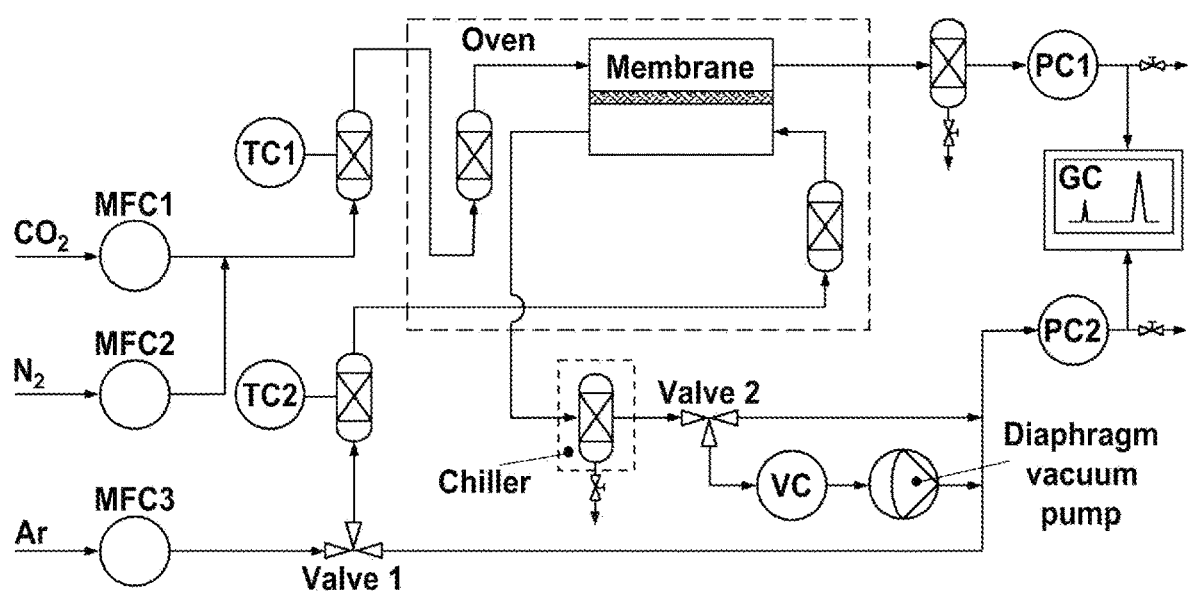
FIG. 2 illustrates the gas permeation unit used for gas permeation measurements which allows for sweep and vacuum operations.

The transport properties of the composite membrane were measured by a gas permeation unit shown in FIG. 2, which allowed for both sweep and vacuum mode operations on the permeate side. The synthesized membrane was loaded into a stainless-steel rectangular permeation cell inside a temperature-controlled oven (Bemco Inc. Simi Valley, Calif.) with an effective area of 2.7 cm². The membrane was supported by a sintered stainless-steel plate with an average pore size of 100 μm. A 100-sccm dry feed gas containing 20% $CO_2$ and 80% $N_2$ was used. The mixed gas was achieved by mixing the two gas streams of $CO_2$ and $N_2$ controlled by two mass flow controllers (MFC1 and MFC2, Alicat Scientific, Tucson, Ariz.), respectively. When a sweep gas was used on the permeate side, a third mass flow controller (MFC3, Alicat Scientific, Tucson, Ariz.) was employed to pass a 30-sccm dry argon, which was directed by Valve 1 to the permeate side. The feed and sweep gases were fully saturated with water vapor by bubbling through 100 mL water in two 500 mL stainless-steel humidifiers (Swagelok, Westerville, Ohio) packed with 60 vol. % Raschig rings, respectively. The humidifier temperature was controlled at 57° C., which is the typical flue gas temperature leaving the flue gas desulfurization (FGD) unit. Before reaching the permeation cell, the feed and sweep streams passed through two dry pressure vessels packed with Raschig rings, respectively, to remove any entrapped water droplets. The feed and sweep pressures were controlled at 1-5 atm (abs) and 1 psig, respectively, by two near-ambient pressure regulators, PC1 and PC2. The two outlet gases were sent to an Agilent 6890N gas chromatograph (GC, Agilent Technologies, Palo Alto, Calif.) for composition analysis after the moisture was knocked out by two respective condensers at room temperature. The GC was equipped with thermal conductivity detectors and a SUPELCO Carboxen® 1004 micropacked GC column (Sigma-Aldrich, St. Louis, Mo.).

For the vacuum mode, the permeate side of the permeation cell was connected to an Ebara Md.1 vacuum diaphragm pump (Ebara Technologies, Inc., Sacramento, Calif.). The permeate pressure was controlled precisely at 0.1-0.9 atm by a vacuum regulator (VC, Alicat Scientific, Inc., Tucson, Ariz.). Before the permeate stream entered the vacuum pump, it passed through a 1-L stainless-steel water knockout vessel that was cooled by a chiller (Fisher Scientific, Hampton, N.H.) at 0° C. to remove the moisture. The 30-sccm dry argon was directed by Valve 1 to carry the vacuum pump discharge to the GC for composition analysis.

The cross-section morphologies of the membranes before and after testing were observed by scanning electron microscopy (SEM). It was conducted using FEI Nova Nano SEM 400 (FEI Company, Hillsboro, Oreg.).

Example 1A (Comparative)

In this example, no carbon nanotubes were incorporated so that the membrane selective layer included only the polyamine, PVAm and the aminoacid salt, PZEA-Sar. The purpose was to manifest the different membrane performances when it was tested with argon sweep or vacuum on the permeate side.

10 g of PVAm aqueous solution (1.5 wt. %, ~200 cp viscosity) was concentrated to 4 wt. % by evaporating the water with a $N_2$ purge. 1.968 g PZEA-Sar aqueous solution (43.19 wt. %) was added into the concentrated PVAm solution to form a homogeneous coating solution. The coating solution had a fixed-to-mobile carrier ratio of 15/85 (wt./wt.), which rendered a viscosity of approximately 1400 cp. A GARDCO adjustable micrometer film applicator (Paul N. Gardner Company, Pompano Beach, Fla.) was used to coat the coating solution on a nanoporous PES substrate with an average surface pore size of 32.0 nm. The membrane was dried overnight before the gas permeation test. A selective layer thickness of 170 nm was achieved by adjusting the gap setting of the film applicator. This membrane was tested with both argon sweep and vacuum. For the test with argon sweep, the feed and permeate pressures were 1.5 and 1 psig, respectively, corresponding to a feed-to-permeate pressure ratio of ~1. For the test with vacuum, the feed pressure was 1.5 psig while the permeate pressure was 0.2 atm, resulting in a feed-to-permeate pressure ratio of ~5. The $CO_2$ permeances and $CO_2/N_2$ selectivities from the two different testing conditions are shown in Table 1.

Figure 3A:
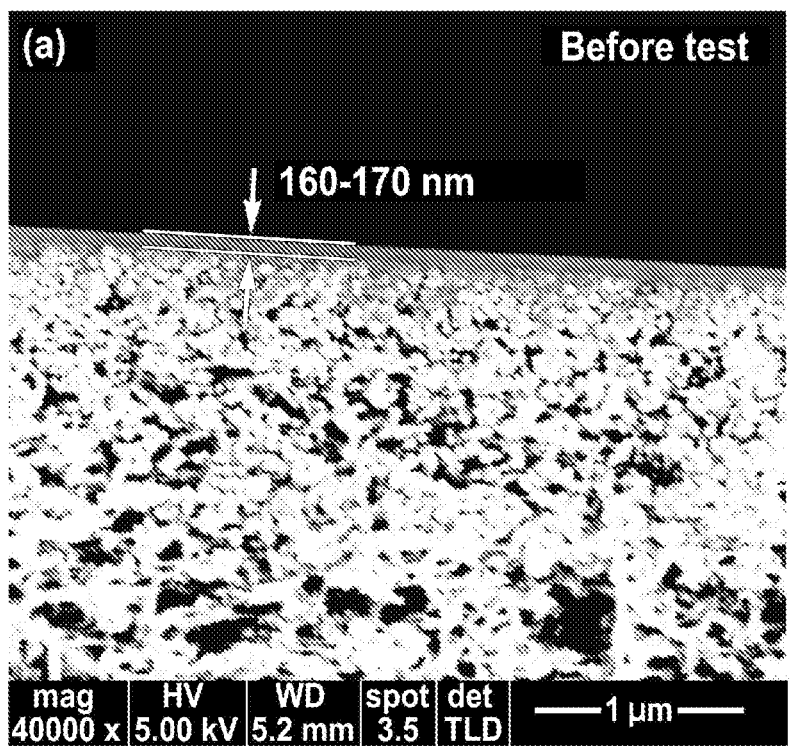
FIGS. 3A and 3B show SEM images of membrane cross-sections for the membrane prepared in Example 1A.
Figure 3B:
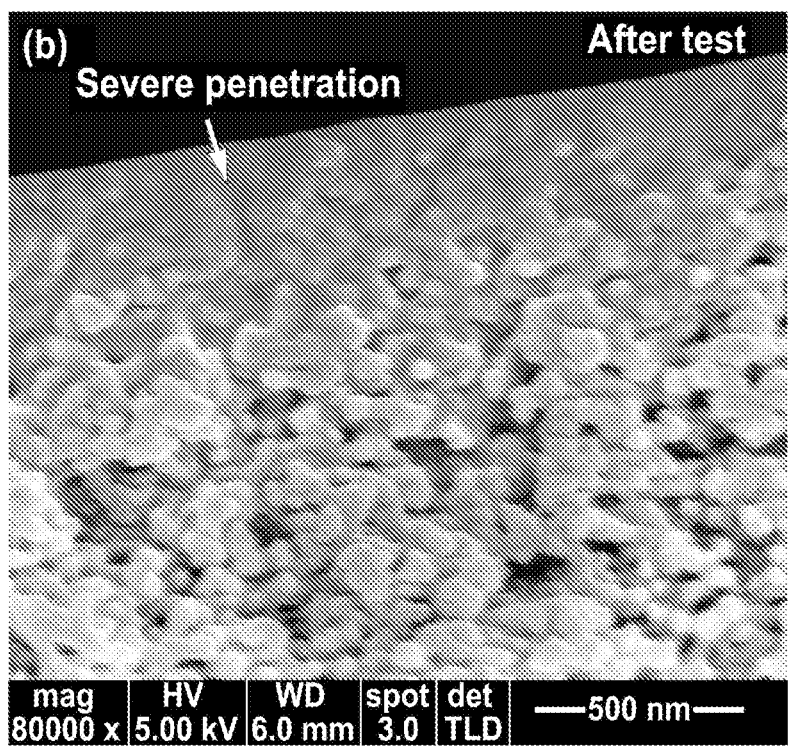

As seen, the membrane exhibited a desirable $CO_2$ permeance of 975 GPU (1 GPU=$10^{-6}$ cm³ (STP)· cm$^{-2}$·s$^{-1}$·cmHg$^{-1}$) with a high $CO_2/N_2$ selectivity of 163 when tested by the argon sweep. When a vacuum was pulled on the permeate side, however, the permeance was reduced to 217 GPU. With a feed gas saturated with water vapor at 57° C., the PVAm in the selective layer was highly swollen. The suction on the permeate dragged the selective layer into the pores of the nanoporous substrate, thereby increased the mass transfer resistance for $CO_2$. Clearly, the deteriorated performance under vacuum was due to the lack of mechanical strength in the selective layer. The cross-sectional SEM images of the membrane before and after the vacuum test are shown in FIG. 3. FIG. 3A shows the membrane was intact with a distinct selective layer of about 165 nm thickness before the vacuum test whereas FIG. 3B exhibits a severe penetration of the membrane into the substrate pores after the vacuum test.

TABLE 1

Transport results of membrane containing no carbon nanotubes.

| | Sweep | | Vacuum | |
| --- | --- | --- | --- | --- |
| | $CO_2$ | $CO_2/N_2$ | | |
| Membrane | permeance (GPU) | ideal selectivity | $CO_2$ permeance (GPU) | $CO_2/N_2$ ideal selectivity |
| Example 1A | 975 | 163 | 217 | 359 |

Example 1B (Comparative)

In this example, the pristine MWNTs were incorporated in the selective layer to enhance its mechanical strength. For 20 g of the dilute PVAm solution (1.5 wt. %), it was concentrated to 4 wt. % by evaporating the water under a $N_2$ purge. Then, 6.158 g MWNTs dispersion (1 wt. %) was added in the concentrated PVAm solution dropwise under vigorous mixing. After this, the mixture was sonicated to re-disperse. Afterwards, the water introduced by the MWNTs dispersion was evaporated by $N_2$. Finally, 3.936 g PZEA-Sar aqueous solution (43.19 wt. %) was added in the dispersion to form a homogeneous coating solution. The viscosity of the coating solution, however, was only approximately 150 cp. The coating solution was coated on the nanoporous PES substrate in the same way as described in Example 1A. After overnight drying, the selective layer contained 3 wt. % carbon nanotubes in the total solid content, and the PVAm-to-PZEA-Sar ratio was still 15/85 (wt./wt.). This membrane was also tested with argon sweep and vacuum, respectively, and the transport results are shown in Table 2. Owing to the mechanical strength of the carbon nanotubes, the $CO_2$ permeance under vacuum was improved to 577 GPU. However, it was still 296 GPU lower than the one demonstrated by argon sweep. The lower permeance under vacuum was partially attributed to the low viscosity of the coating solution, which led to severe penetration during the membrane coating.

TABLE 2

Transport results of membrane containing pristine carbon nanotubes.

| Membrane | Sweep | | Vacuum | |
| --- | --- | --- | --- | --- |
| | $CO_2$ permeance (GPU) | $CO_2/N_2$ ideal selectivity | $CO_2$ permeance (GPU) | $CO_2/N_2$ ideal selectivity |
| Example 1B | 873 | 133 | 577 | 102 |

Example 1C

In this example, the MWNTs wrapped by PVP3-co-VAc7 were incorporated. For 20 g of the dilute PVAm solution (1.5 wt. %), it was concentrated to 4 wt. % by evaporating the water under a $N_2$ purge. Then, 6.158 g PVP3-co-VAc7/MWNTs dispersion (1 wt. %) was added in the concentrated PVAm solution dropwise under vigorous mixing. After this, the mixture was sonicated to re-disperse. Afterwards, the water introduced by the MWNTs dispersion was evaporated by $N_2$. Finally, 3.936 g PZEA-Sar aqueous solution (43.19 wt. %) was added in the dispersion to form a homogeneous coating solution. The viscosity of the coating solution, however, was only approximately 979 cp. The coating solution was coated on the nanoporous PES substrate in the same way as described in Example 1A. After overnight drying, the selective layer contained 3 wt. % carbon nanotubes in the total solid content, and the PVAm-to-PZEA-Sar ratio was still 15/85 (wt./wt.). This membrane was also tested with argon sweep and vacuum, respectively, and the transport results are shown in Table 3. The incorporation of PVP3-co-VAc7/MWNTs resulted in a further improved $CO_2$ permeance of 814 GPU, which was 597 GPU higher than the membrane containing no carbon nanotubes.

TABLE 3

Transport results of membrane containing acid treated carbon nanotubes.

| Membrane | Sweep | | Vacuum | |
| --- | --- | --- | --- | --- |
| | $CO_2$ permeance (GPU) | $CO_2/N_2$ ideal selectivity | $CO_2$ permeance (GPU) | $CO_2/N_2$ ideal selectivity |
| Example 1C | 944 | 163 | 814 | 165 |

Example 1D

In this example, the MWNTs wrapped by PVP alone were incorporated. For 20 g of the dilute PVAm solution (1.5 wt. %), it was concentrated to 4 wt. % by evaporating the water under a $N_2$ purge. Then, 6.158 g PVP/MWNTs dispersion (1 wt. %) was added in the concentrated PVAm solution dropwise under vigorous mixing. After this, the mixture was sonicated to re-disperse. Afterwards, the water introduced by the MWNTs dispersion was evaporated by $N_2$. Finally, 3.936 g PZEA-Sar aqueous solution (43.19 wt. %) was added in the dispersion to form a homogeneous coating solution. The viscosity of the coating solution, however, was approximately 1313 cp. The coating solution was coated on the nanoporous PES substrate in the same way as described in Example 1A. After overnight drying, the selective layer contained 3 wt. % carbon nanotubes in the total solid content, and the PVAm-to-PZEA-Sar ratio was still 15/85 (wt./wt.). This membrane was also tested with argon sweep and vacuum, respectively, and the transport results are shown in Table 4. The incorporation of PVP/MWNTs resulted in a further improved $CO_2$ permeance of 939 GPU. The exhibited permeance was close to the one characterized by the argon sweep.

TABLE 4

Transport results of membrane containing amino-functionalized carbon nanotubes.

| Membrane | Sweep | | Vacuum | |
| --- | --- | --- | --- | --- |
| | $CO_2$ permeance (GPU) | $CO_2/N_2$ ideal selectivity | $CO_2$ permeance (GPU) | $CO_2/N_2$ ideal selectivity |
| Example 1D | 969 | 174 | 939 | 161 |

Example 1E

Figure 4A:
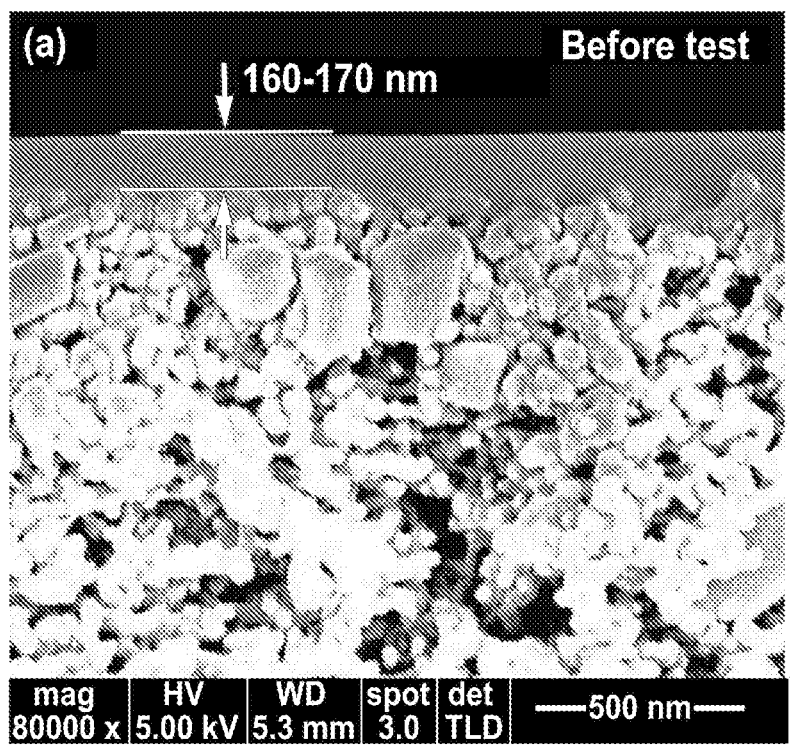
FIGS. 4A and 4B show SEM images of membrane cross-sections.
Figure 4B:
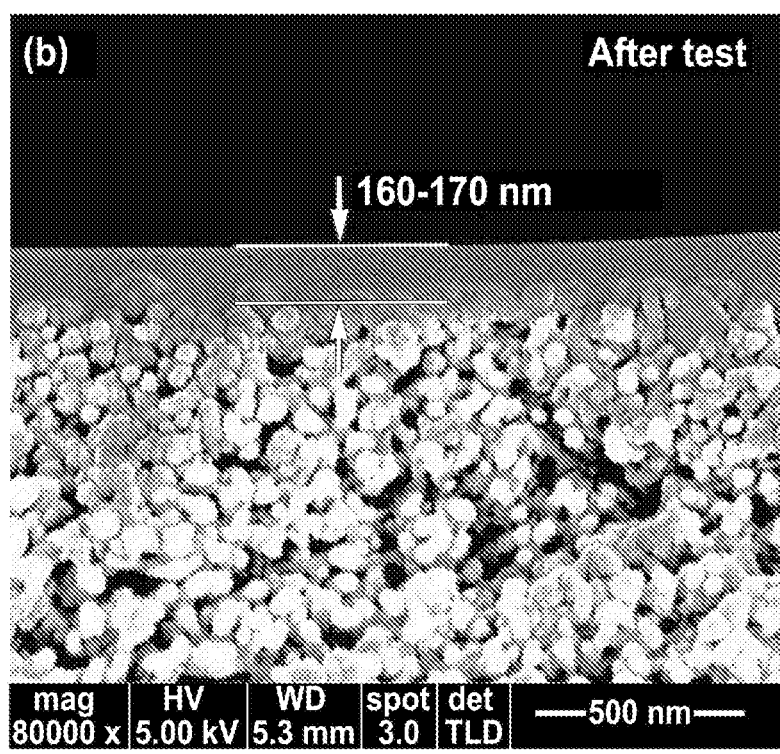

In this example, the MWNTs wrapped by PVP7-co-Vac3 were incorporated. For 20 g of the dilute PVAm solution (1.5 wt. %), it was concentrated to 4 wt. % by evaporating the water under a $N_2$ purge. Then, 6.158 g PVP7-co-Vac3/MWNTs dispersion (1 wt. %) was added in the concentrated PVAm solution dropwise under vigorous mixing. After this, the mixture was sonicated to re-disperse. Afterwards, the water introduced by the MWNTs dispersion was evaporated by $N_2$. Finally, 3.936 g PZEA-Sar aqueous solution (43.19 wt. %) was added in the dispersion to form a homogeneous coating solution. The viscosity of the coating solution, however, was approximately 1421 cp. The coating solution was coated on the nanoporous PES substrate in the same way as described in Example 1A. After overnight drying, the selective layer contained 3 wt. % carbon nanotubes in the total solid content, and the PVAm-to-PZEA-Sar ratio was still 15/85 (wt./wt.). This membrane was also tested with argon sweep and vacuum, respectively, and the transport results are shown in Table 5. The incorporation of the PVP7-co-Vac3/MWNTs resulted in a further improved $CO_2$ permeance of 970 GPU. The exhibited permeance almost reproduced the one characterized by the argon sweep. The cross-sectional SEM images of the membrane before and after the vacuum test are shown in FIGS. 4A and 4B. As shown in these figures, the selective layer after the vacuum test was distinct with a thickness of about 165 nm, which was similar to the selective before the test.

TABLE 5

Transport results of membrane containing amino-functionalized carbon nanotubes.

| Membrane | Sweep | | Vacuum | |
| --- | --- | --- | --- | --- |
| | $CO_2$ permeance (GPU) | $CO_2/N_2$ ideal selectivity | $CO_2$ permeance (GPU) | $CO_2/N_2$ ideal selectivity |
| Example 1E | 979 | 159 | 970 | 159 |

Example 1F

Figure 5A:
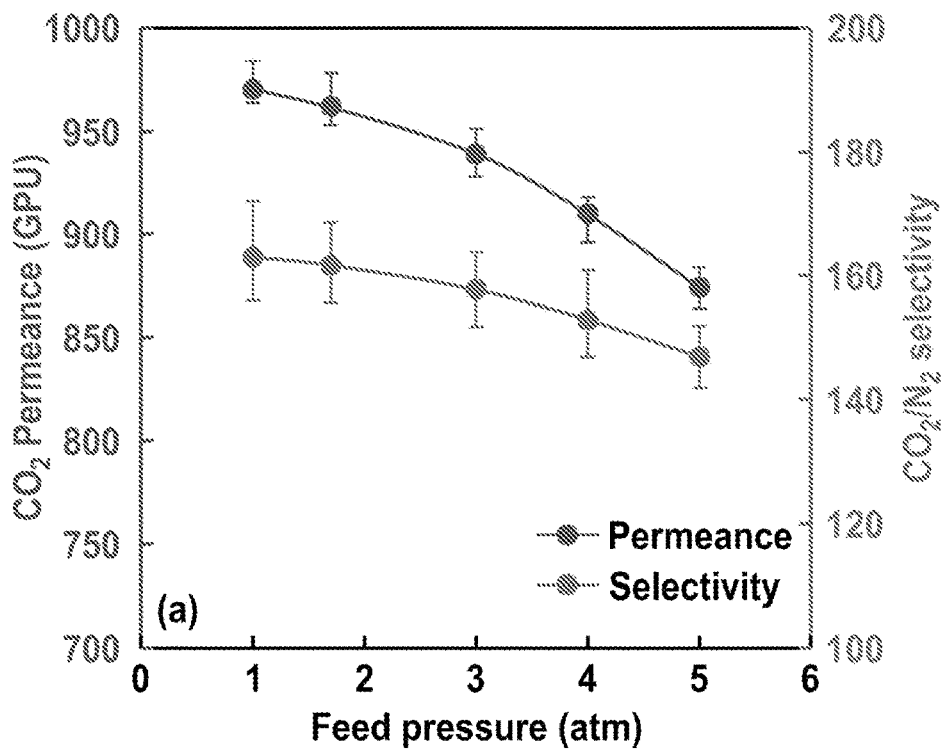
FIGS. 5A and 5B show the effects of feed pressure on $CO_2$ permeance and $CO_2/N_2$ selectivity at 57° C. with a vacuum of 0.2 atm on the permeate side.
Figure 5B:
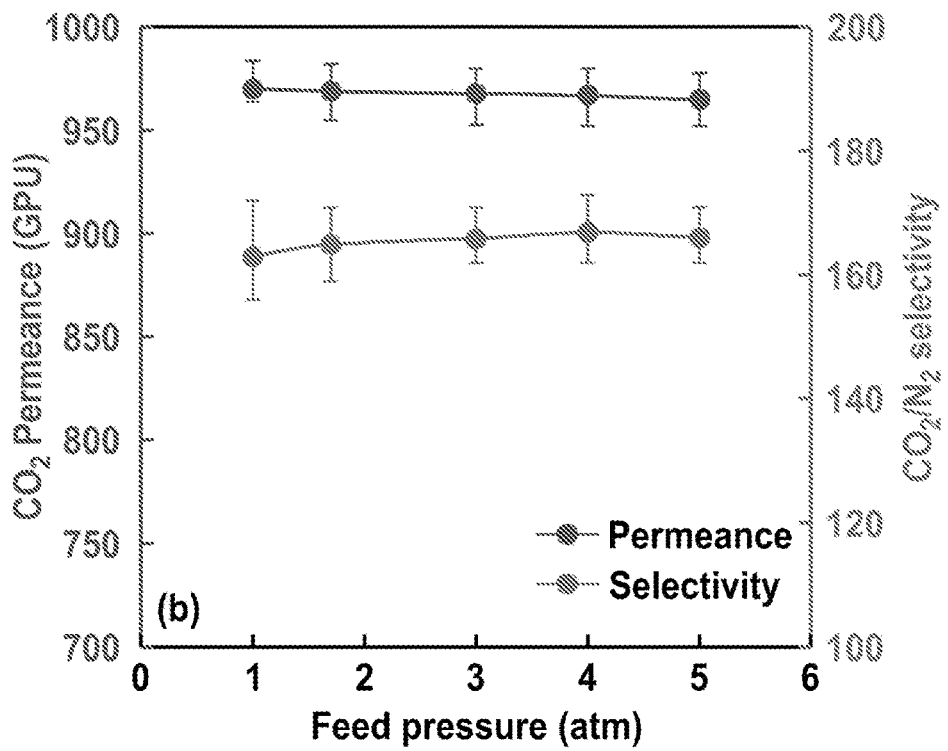

In this example, the membrane reinforced by PVP7-co-Vac3/MWNTs (as described in Example 1E) was tested at an elevated feed pressure of 1-5 atm (abs). Along with the 0.2 atm of vacuum pulled on the permeate side, the feed-to-permeate pressure ratio was as high as 25. The transport performances of the membrane are shown in FIG. 5A. By elevating the feed pressure from 1 to 5 atm, the permeance decreased from 970 to 874 GPU. There were two possible causes for the reduced $CO_2$ permeance. Firstly, membrane compaction could occur upon feed compression, which densified the polymer matrix, thereby a reduced permeance. Secondly, the $CO_2$ permeance of the facilitated transport membrane could depend on the feed $CO_2$ partial pressure, i.e., at a higher $CO_2$ partial pressure, the carrier saturation phenomenon occurred. To distinguish these two effects, the membrane was tested with a feed pressure of 1-5 atm but the feed $CO_2$ concentration was adjusted to maintain a constant $CO_2$ partial pressure of 0.166 atm. As shown in FIG. 5B, the $CO_2$ permeance maintained nearly the same at different feed pressures, which confirmed that the carrier saturation phenomenon was the dominant factor. It also indicated that the dispersed MWNTs not only enhanced the selective layer stiffness to resist the bending deformation of the membrane induced by the vacuum suction. Also, a feed compression, along with a vacuum suction, was not enough to deform the reinforced selective layer.

REFERENCES

[1] R. W. Baker, G. W. Johannes, T. C. Merkel, H. Lin, R. Daniels, S. Thompson, "Gas Separation Process Using Membranes with Permeate Sweep to Remove $CO_2$ from Combustion Gases", U.S. Pat. No. 7,964,020, issued Jun. 21, 2011.

[2] W. S. W. Ho, H. Verweij, K. Shqau, K. Ramasubramanian, "Systems, Compositions, and Methods for Fluid Purification", U.S. Pat. No. 9,216,390, issued Dec. 22, 2015.

[3] M. Sandru, S. H. Haukebø, M. B. Hägg, Composite hollow fiber membranes for $CO_2$ capture, J. Memb. Sci. 346 (2010) 172-186.

[4] Y. Zhao, B. T. Jung, L. Ansaloni, W. S. W. Ho, Multi-walled carbon nanotube mixed matrix membranes containing amines for high pressure $CO_2/H_2$ separation, J. Memb. Sci. 459 (2014) 233-243.

[5] L. Ansaloni, Y. Zhao, B. T. Jung, K. Ramasubramanian, M. G. Baschetti, W. S. W. Ho, Facilitated transport membranes containing amino-functionalized multi-walled carbon nanotubes for high-pressure $CO_2$ separations, J. Memb. Sci. 490 (2015) 18-28.

[6] Y. Chen, W. S. W. Ho, High-molecular-weight polyvinylamine/piperazine glycinate membranes for $CO_2$ capture from flue gas, J. Memb. Sci. (2016) 376-384.

[7] D. Wu, L. Zhao, V. K. Vakharia, W. Salim, W. S. W. Ho, Synthesis and characterization of nanoporous polyethersulfone membrane as support for composite membrane in $CO_2$ separation: From lab to pilot scale, J. Member. Sci., 510 (2016) 58-71.

Example 2: Amine-Containing Facilitated Transport Membranes for $Co_2/N_2$ Separation Abstract This example relates to amine-containing facilitated transport membranes comprising mobile $CO_2$ carriers for $CO_2/N_2$ separation. In the selective layer of the membrane, an amine-containing polymer, serving as the fixed-site carrier, is used to form the polymer matrix, in which polyvinylpyrrolidone-wrapped multi-walled carbon nanotubes are dispersed to reinforce the mechanical properties of the polymeric material. Aminoacid salts synthesized by reacting a base, e.g., piperazine and 2-(1-piperazinyl)ethylamine, and an aminoacid, e.g., glycine, sarcosine, and 2-aminoisobutyric acid, are employed as mobile carriers to facilitate the transport of $CO_2$. The invention has demonstrated that these aminoacid salts can serve as effective mobile carriers to enhance the permeation of $CO_2$ through ultrathin membranes at operating temperatures of 57-87° C. In the $CO_2/N_2$ separation, a vacuum can be pulled or a sweep gas (e.g., a water vapor-containing stream, air, or argon) can be used on the permeate side to provide or increase the driving force for the separation.

BACKGROUND

Ever since the Industrial Revolution, the large amount of $CO_2$ emission from the combustion of fossil fuels has become the major reason for global warming. Post-combustion carbon capture encompasses technologies that remove $CO_2$ from large stationary sources (e.g., flue gases from coal- and/or natural gas-fired power plants), followed by compressing the $CO_2$ to 2215 psia for sequestrating in geological formations or using it for enhanced oil recovery. Among all the technologies in the post-combustion portfolio, $CO_2$-selective polymeric membrane has been suggested as a promising approach due to its energy efficiency, operational simplicity, environmental friendliness, and ability to overcome thermodynamic solubility equilibrium limitation. A widely engaged approach for polymeric membrane synthesis is to coat an ultrathin selective layer of polymer onto a nanoporous support, typically ultrafiltration membranes made from polysulfone, polyethersulfone, or polyetherimide. Multiple research efforts have been dedicated in designing polymer with high $CO_2$ permeance and decent $CO_2/N_2$ selectivity. On one hand, polar functional groups, such as ethylene oxide group, have been incorporated to increase the physical $CO_2$ solubility in the polymer matrix; the dissolved $CO_2$ molecules diffuse through the membrane [1-3]. On the other hand, reactive functional groups and compounds, such as amines, have been used as mobile carriers or bounded to the polymer backbone as fixed-site carriers to reversibly react with $CO_2$ [4-6]. The chemical reaction enhances the permeation of $CO_2$ through the membrane, and this type of membrane is named as facilitated transport membrane.

In the context of facilitated transport membrane, a small molecule containing one or multiple amino group(s) can be incorporated in the polymer matrix as a mobile carrier. Such a mobile carrier reacts with $CO_2$ on the feed side to form a reaction product. The reaction product then diffuses across the membrane and releases the $CO_2$ to the permeate side. Inspired by the extensive research in aqueous amine absorption, amino alcohols, such as monoethanolamine and diethanolamine, were among the first few small molecules that were employed to enhance the $CO_2$ flux through polyvinylamine (PVAm) or poly(vinyl alcohol) (PVA) membranes [7]. To increase the molar $CO_2$ loading of the mobile carrier, multi-amines, such as ethylenediamine [7] and piperazine [8], were also proven as effective mobile carriers. One possible drawback of the multi-amines, however, is their relatively high volatility, which may result in carrier loss and hence a reduction in the membrane permeance. To resolve this issue, non-volatile aminoacid salts were synthesized by deprotonating an aminoacid, such as 2-aminoisobutyric acid or glycine, with a strong base, typically potassium hydroxide [9-11]. Recently, Chen and Ho reported a high-flux composite membrane with stable performance by using piperazine glycinate as the mobile carrier in a polymer matrix formed by PVAm [11]. In the present example, novel aminoacid salts by reacting a base, e.g., a cyclic secondary or tertiary amine such as piperazine or 2-(1-piperazinyl) ethylamine, and an aminoacid, e.g., glycine, sarcosine, and 2-aminoisobutyric acid, have been employed as mobile carriers to facilitate the transport of $CO_2$. These aminoacid salts can serve as more effective mobile carriers than those reported to enhance the permeation of $CO_2$ through ultrathin membranes at operating temperatures of 57-87° C.

Materials and Methods

In this example, piperazine (99 wt. %), 2-(1-piperazinyl) ethylamine (99 wt. %), 2-aminoisobutyric acid (99 wt. %), polyvinylpyrrolidone (360 kDa), sodium dodecyl sulfate (SDS, 99 wt. %), and potassium hydroxide (85 wt. %) were purchased from Sigma-Aldrich. Glycine (99 wt. %) and sarcosine (99 wt. %) were purchased from Acros Organics. These chemicals were used without further purification. In terms of the amine-containing polymer, it can be but not limited to polyvinylamine (PVAm), polyallylamine, polyethylenimine, copolymers, and blends thereof. The amine-containing polymer employed in the invention was PVAm purified from a commercial product named Polymin® VX from BASF (Vandalia, Ill.). The PVAm has a high weight average molecular weight of 2,000 kDa. The amine-containing polymer can have a weight average molecular weight of from 300 to 3,000 kDa, but preferably to be higher than 1000 kDa. Carbon nanotubes can be dispersed in PVAm to reinforce the mechanical strength of the membrane. Multi-walled carbon nanotubes (MWNTs) were used in this invention, which were under the name Graphistrength® C100 (0.1-10 μm length, 10-15 nm diameter) from Arkema Inc. (Philadelphia, Pa.). The length of the nanotubes can be in the range from 50 nm to 100 but preferably from 200 nm to 20 μm. The diameter of the nanotubes is unlimited, but advantageously in the range of 10 to 50 nm.

Dispersion of Carbon Nanotubes

The commercial carbon nanotubes are inherently difficult to disperse in water since they are typically supplied as heavily entangled bundles. Ultrasonication was used in this invention as an effective way to disperse carbon nanotubes in water. However, the physical wrapping of hydrophilic polyvinylpyrrolidone (PVP) was used to facilitate this process and stabilize the carbon nanotubes in water dispersion. The pristine MWNTs were dispersed in a 1 wt. % SDS aqueous solution by ultrasonication. The MWNT content in the dispersion was 1 wt. %. To the MWNT dispersion, PVP powder was added with a PVP-to-MWNT weight ratio of 1:1. The mixture was then incubated at 50° C. for 5 hours to facilitate the PVP wrapping. The resultant mixture was sonicated for 30 min, and centrifuged at 10,000 rpm for 3 min. The supernatant was collected, in which the PVP-to-MWNT weight ratio was approximately 1:2.

Coating Solution and Membrane Preparation

The PVP-wrapped MWNTs were added in the PVAm aqueous solution with a certain polymer concentration and carbon nanotube loading. The carbon nanotubes were dispersed in the polymer by conducting another ultrasonication. Afterwards, a certain amount of aminoacid salt was incorporated in the dispersion to form the coating solution. The coating solution was then coated on a polyethersulfone (PES) nanoporous substrate by using the "knife casting" technique. After the water was evaporated, the membrane was ready for a gas permeation test.

Gas Permeation Measurements

Transport measurements were carried out by using a gas permeation setup as described in the following. An amine-containing membrane sample was loaded into a stainless steel rectangular permeation cell inside a temperature-controlled oven (Bemco Inc., Simi Valley, Calif.) with an effective membrane area of 2.7 $cm^2$. On the feed side, a 92 sccm binary gas mixture containing 20% $CO_2$ and 80% $N_2$ was fully saturated with water vapor by using a 500-mL stainless-steel humidifier (Swagelok, Westerville, Ohio) filled with 60 vol. % packing of Raschig rings and 100 mL water at 57° C. The feed pressure was controlled at 4 atm by a near ambient pressure regulator. On the permeate side, a vacuum was pulled to provide the transmembrane driving force. The compositions of the retentate and permeate streams were analyzed by a gas chromatograph (GC) equipped with thermal conductivity detectors (Agilent Technologies, Palo Alto, Calif.). The SUPELCO Carboxen® 1004 micropacked GC column (Sigma-Aldrich, St. Louis, Mo.) was installed for the analysis. The permeate side of the permeation cell was connected to a diaphragm vacuum pump (Ebara Corporation, Tokyo, Japan). The permeate pressure was controlled precisely at 0.2 atm by a vacuum regulator (Alicat Scientific, Inc., Tucson, Ariz.). Before the permeate stream entered the vacuum pump, it passed through a 1-L stainless-steel water knockout (Swagelok, Westerville, Ohio) that was cooled by a chiller (Fisher Scientific, Hampton, N.H.) at 0° C. to remove the moisture. The discharge of the vacuum pump was carried by a 30 sccm dry argon sweep to the GC for composition analysis.

Example 2a (Comparative)

In this example, piperazine glycinate was synthesized and used as the mobile carrier. 1.061 g glycine was dissolved in 5.002 g DI water to form a 17.5 wt. % aqueous solution. To the glycine solution, 1.217 g piperazine was added under vigorous mixing, which resulted in a piperazine glycinate (PG) mobile carrier solution with a concentration of 30.978 wt. %. Separately, 20 g of PVAm aqueous solution (1.5 wt. %, ~200 cp viscosity) was concentrated to 4.5 wt. % by evaporating the water with a $N_2$ purge. To the concentrated PVAm solution, a calculated amount of PVP-wrapped MWNTs was added dropwise under vigorous mixing, aiming for a 3 wt. % MWNT loading in the final selective-layer total solid. After this, the mixture was sonicated in an ultrasonication bath to re-disperse, which typically took 6 hours. Calculated amounts of PG solution were added to form the coating solutions, which had PG-to-PVAm ratios of 65/35, 75/25, and 85/15 (wt./wt.), respectively. A GARDCO adjustable micrometer film applicator (Paul N. Gardner Company, Pompano Beach, Fla.) was used to cast the coating solution on a nanoporous PES substrate with an average surface pore size of about 32 nm. The membrane was dried overnight before the gas permeation test. A selective-layer thickness of 170 nm was achieved by adjusting the gap setting of the film applicator. The membranes were tested with a feed pressure of 4 atm and a permeate vacuum of 0.2 atm. The $CO_2$ permeances and $CO_2/N_2$ selectivities with different PG contents are shown in Table 6. As seen, the membranes exhibited decent $CO_2$ permeances of ~800 GPU (1 GPU=$10^{-6}$ $cm^3$ (STP)·$cm^{-2}$·$s^{-1}$·$cmHg^{-1}$) with a high $CO_2/N_2$ selectivities of ~150. Moreover, the $CO_2$ permeance increased with increasing content of PG. The highest permeance of 839 GPU was obtained by a PG-to-PVAm weight ratio of 85/15.

TABLE 6

Transport results of membranes containing PG as mobile carrier.

| | PG/PVAm (wt./wt.) | | |
|---|---|---|---|
| | 65/35 | 75/25 | 85/15 |
| $CO_2$ permeance (GPU) | 794 | 811 | 839 |
| $CO_2/N_2$ selectivity | 144 | 157 | 146 |

Example 2B—Membranes Comprising PZEA-Gly as a Mobile Carrier

In this example, piperazine was replaced by 2-(1-piperazinyl)ethylamine to react with glycine. Firstly, 1.061 g glycine was dissolved in 5.002 g DI water to form a 17.5 wt. % aqueous solution. To the glycine solution, 1.826 g 2-(1-piperazinyl)ethylamine was added under vigorous mixing, which resulted in a 2-(1-piperazinyl)ethylamine glycinate (PZEA-Gly) mobile carrier solution with a concentration of 36.229 wt. %. Separately, 20 g of PVAm aqueous solution (1.5 wt. %, ~200 cp viscosity) was concentrated to 4.5 wt. % by evaporating the water with a $N_2$ purge. To the concentrated PVAm solution, a calculated amount of PVP-wrapped MWNTs was added dropwise under vigorous mixing, aiming for a 3 wt. % MWNT loading in the final selective-layer total solid. After this, the mixture was sonicated in the ultrasonication bath to re-disperse. Calculated amounts of PZEA-Gly solution were added to form the coating solutions, which had PZEA-Gly-to-PVAm ratios of 65/35, 75/25, and 85/15 (wt./wt.), respectively. Thee membranes were tested with a feed pressure of 4 atm and a permeate vacuum of 0.2 atm. The $CO_2$ permeances and $CO_2/N_2$ selectivities with different PZEA-Gly contents are shown in Table 7. As shown, a 50-70 GPU increase in $CO_2$ permeance was demonstrated by PZEA-Gly compared to PZ-Gly as the mobile carrier. The highest permeance was 911 GPU with a PZEA-Gly-to-PVAm weight ratio of 85/15.

TABLE 7

Transport results of membranes containing PZEAG as mobile carrier.

| | PZEA-Gly/PVAm (wt./wt.) | | |
|---|---|---|---|
| | 65/35 | 75/25 | 85/15 |
| $CO_2$ permeance (GPU) | 845 | 873 | 911 |
| $CO_2/N_2$ selectivity | 149 | 141 | 148 |

Example 2C—Membranes Comprising PZEA-Sar as a Mobile Carrier

In this example, glycine was replaced by sarcosine to react with 2-(1-piperazinyl)ethylamine. Firstly, 1.580 g sarcosine was dissolved in 5.002 g DI water to form a 24.0 wt. % aqueous solution. To the sarcosine solution, 2.291 g 2-(1-piperazinyl)ethylamine was added under vigorous mixing, which resulted in a 2-(1-piperazinyl)ethylamine sarcosinate (PZEA-Sar) mobile carrier solution with a concentration of 43.190 wt. %. Separately, 20 g of PVAm aqueous solution (1.5 wt. %, ~200 cp viscosity) was concentrated to 4.5 wt. % by evaporating the water with a $N_2$ purge. To the concentrated PVAm solution, a calculated amount of PVP-wrapped MWNTs was added dropwise under vigorous mixing, aiming for a 3 wt. % MWNT loading in the final selective-layer total solid. After this, the mixture was sonicated in the ultrasonication bath to re-disperse. Calculated amounts of PZEA-Sar solution were added in to form the coating solutions, which had PZEA-Sar-to-PVAm ratios of 65/35, 75/25, and 85/15 (wt./wt.), respectively. The membranes were tested with a feed pressure of 4 atm and a permeate vacuum of 0.2 atm. The $CO_2$ permeances and $CO_2/N_2$ selectivities with different PZEA-Sar contents are shown in Table 8. As shown, an approximately 15 GPU increase in $CO_2$ permeance was demonstrated by PZEA-Sar compared to PZEA-Gly as the mobile carrier. The highest permeance was 926 GPU with a PZEA-Sar-to-PVAm weight ratio of 85/15.

TABLE 8

Transport results of membranes containing PZEAS as mobile carrier.

| | PZEA-Sar/PVAm (wt./wt.) | | |
|---|---|---|---|
| | 65/35 | 75/25 | 85/15 |
| $CO_2$ permeance (GPU) | 859 | 892 | 926 |
| $CO_2/N_2$ selectivity | 155 | 144 | 148 |

Example 2D—Membranes Comprising PZEA-AIBA and PZEA-Sar as Mobile Carriers

In this example, a part of sarcosine was replaced by 2-aminoisobutyric acid to react with 2-(1-piperazinyl)ethylamine with the aid of KOH. Firstly, 1.250 g 2-(1-piperazinyl)ethylamine was dissolved in 5.002 g DI water to form a 25.0 wt. % aqueous solution. KOH aqueous solution with a concentration of 1 M was added in till the pH value reached 12. After this, 0.998 g 2-aminoisobutyric acid was added; the mixture was kept under vigorous mixing until the 2-aminoisobutyric acid was fully dissolved; the solution was denoted as PZEA-MBA. Separately, 1.580 g sarcosine was dissolved in 5.002 g DI water to form a 24.0 wt. % aqueous solution. To the sarcosine solution, 2.291 g 2-(1-piperazinyl) ethylamine was added under vigorous mixing, which resulted in a PZEA-Sar solution with a concentration of 43.190 wt. %. 3.228 g of this PZEA-Sar solution was then added into the PZEA-AIBA solution gradually, which resulted in a PZEA-AIBA/PZEA-Sar mobile carrier solution with an AIBA-to-sarcosine molar ratio of 60/40. Separately, 20 g of PVAm aqueous solution (1.5 wt. %, ~200 cp viscosity) was concentrated to 4.5 wt. % by evaporating the water with a $N_2$ purge. To the concentrated PVAm solution, a calculated amount of PVP-wrapped MWNTs was added dropwise under vigorous mixing, aiming for a 3 wt. % MWNT loading in the final selective-layer total solid. After this, the mixture was sonicated in the ultrasonication bath to re-disperse. Calculated amounts of PZEA-AIBA/PZEA-Sar solution were added to form the coating solutions, which had PZEA-AIBA/PZEA-Sar-to-PVAm ratios of 65/35, 75/25, and 85/15 (wt./wt.), respectively. The membranes were tested with a feed pressure of 4 atm and a permeate vacuum of 0.2 atm. The $CO_2$ permeances and $CO_2/N_2$ selectivities with different PZEA-AIBA/PZEA-Sar contents are shown in Table 9. As shown, an approximately 15 GPU increase in $CO_2$ permeance was demonstrated by PZEA-MBA/PZEA-Sar compared to PZEA-Sar as the mobile carrier. The highest permeance was 944 GPU with a PZEA-MBA/PZEA-Sar-to-PVAm weight ratio of 85/15.

TABLE 9

Transport results of membranes containing PZEA-AIBA/PZEA-Sar as mobile carriers. (wt./wt.)

| | (PZEA-AIBA/PZEA-Sar)/PVAm | | |
|---|---|---|---|
| | 65/35 | 75/25 | 85/15 |
| $CO_2$ permeance (GPU) | 879 | 910 | 944 |
| $CO_2/N_2$ selectivity | 143 | 152 | 155 |

Example 2E—Membranes Comprising PZEA-AIBA and PZEA-Sar as Mobile Carriers at Various Temperatures In this example, the membrane synthesized in Example 2D with a PZEA-AIBA/PZEA-Sar-to-PVAm ratio of 85/15 was tested at elevated temperatures in the range of 67-87° C., instead of 57° C. The feed pressure was kept at 4 atm; before passing to the membrane, the feed gas was fully saturated with water vapor at the corresponding testing temperature. The vacuum pressure on the permeate side, however, was kept 0.01 atm higher than the saturation pressure of water at the corresponding temperature to avoid water condensation. The $CO_2$ permeances and $CO_2/N_2$ selectivities at different temperatures are shown in Table 10. As shown, the $CO_2$ permeance depended strongly on the operating temperature. The temperature of 67° C. increased the permeance to 1468 GPU with a high selectivity of 162. Further increasing the temperature to 77 and 87° C. resulted in even higher permeances of 2102 and 2957 GPU, respectively. It should be noted that the selectivities at 77 and 87° C. were lower than those at lowertemperatures. However, these selectivities were still considerably higher than those exhibited by membranes without facilitated transport, which were typically less than 20 at an elevated temperature [1-3].

TABLE 10

Transport results of membrane at different operating temperatures.

| | Temperature (° C.) | | | |
|---|---|---|---|---|
| | 57 | 67 | 77 | 87 |
| $CO_2$ permeance (GPU) | 944 | 1468 | 2102 | 2957 |
| $CO_2/N_2$ selectivity | 155 | 162 | 113 | 89 |

REFERENCES

[1] Y. Chen, B. Wang, L. Zhao, P. Dutta, W. S. W. Ho, New Pebax/zeolite Y composite membranes for $CO_2$ capture from flue gas, J. Membr. Sci. 495 (2015) 415-423.

[2] W. Yave, A. Car, S. S. Funari, S. P. Nunes, K.-V. Peinemann, $CO_2$-philic polymer membrane with extremely high separation performance, Macromolecules 43 (2009) 326-333.

[3] W. Yave, A. Car, J. Wind, K.-V. Peinemann, Nanometric thin film membranes manufactured on square meter scale: Ultra-thin films for $CO_2$ capture, Nanotechnology 21 (2010) 395301.

[4] X. He, M.-B. Hägg, Energy efficient process for $CO_2$ capture from flue gas with novel fixed-site-carrier membranes, Energy Procedia 63 (2014) 174-185.

[5] T.-J. Kim, H. Vrålstad, M. Sandru, M.-B. Hägg, Separation performance of PVAm composite membrane for $CO_2$ capture at various pH levels, J. Membr. Sci. 428 (2013) 218-224.

[6] M. Sandru, S. H. HaukebØ, M.-B. Hägg, Composite hollow fiber membranes for $CO_2$ capture, J. Membr. Sci. 346 (2010) 172-186.

[7] Z. Qiao, Z. Wang, S. Yuan, J. Wang, S. Wang, Preparation and characterization of small molecular amine modified PVAm membranes for $CO_2/H_2$ separation, J. Membr. Sci. 475 (2015) 290-302.

[8] Z. Qiao, Z. Wang, C. Zhang, S. Yuan, Y. Zhu, J. Wang, S. Wang, PVAm-PIP/PS composite membrane with high performance for $CO_2/N_2$ separation, AIChE J. 59 (2013) 215-228.

[9] J. Zou, W. S. W. Ho, $CO_2$-selective polymeric membranes containing amines in crosslinked poly(vinyl alcohol), J. Membr. Sci. 286 (2006) 310-321.

[10] J. Huang, J. Zou, W. S. W. Ho, Carbon dioxide capture using a $CO_2$-selective facilitated transport membrane, Ind. Eng. Chem. Res. 47 (2008) 1261-1267.

[11] Y. Chen, W. S. W. Ho, High-molecular-weight polyvinylamine/piperazine glycinate membranes for $CO_2$ capture from flue gas, J. Membr. Sci. (2016)$_{376}$-384.

The devices, systems, and methods of the appended claims are not limited in scope by the specific devices, systems, and methods described herein, which are intended as illustrations of a few aspects of the claims. Any devices, systems, and methods that are functionally equivalent are intended to fall within the scope of the claims. Various modifications of the devices, systems, and methods in addition to those shown and described herein are intended to fall within the scope of the appended claims. Further, while only certain representative devices, systems, and method steps disclosed herein are specifically described, other combinations of the devices, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A membrane comprising:
   a support layer; and
   a selective polymer layer disposed on the support layer;
   wherein the selective polymer layer comprises a selective polymer matrix and carbon nanotubes dispersed within the selective polymer matrix,
   wherein the selective polymer matrix comprises an amine-containing polymer and a mobile carrier comprising 2-(1-piperazinyl)ethylamine-sarcosine salt (PZEA-Sar) and 2-(1-piperazinyl)ethylamine-aminoisobutyric acid (PZEA-AIBA); and
   wherein the carbon nanotubes are wrapped in a hydrophilic polymer.

2. The membrane of claim 1, wherein the selective polymer matrix has a $CO_2:N_2$ selectivity of from 10 to 500 at 57° C. and 1 atm feed pressure.

3. The membrane of claim 1, wherein the amine-containing polymer is selected from the group consisting of polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof.

4. The membrane of claim 1, wherein the hydrophilic polymer comprises a polymer selected from the group consisting of polyvinylalcohol, polyvinylacetate, polyethylene oxide, polyvinylpyrrolidone, polyacrylamine, a polyamine, polysiloxane, copolymers thereof, and blends thereof.

5. The membrane of claim 1, wherein the selective polymer matrix further comprises a cross-linking agent selected from the group consisting of formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof.

6. The membrane of claim 1, wherein the carbon nanotubes comprise single-walled carbon nanotubes or multi-walled carbon nanotubes.

7. The membrane of claim 1, wherein the selective polymer layer comprises from 0.5% to 5% by weight carbon nanotubes, based on the total dry weight of the selective polymer layer.

8. The membrane of claim 1, wherein the carbon nanotubes have an average diameter of from 10 nm to 50 nm.

9. The membrane of claim 1, wherein the carbon nanotubes have an average length of from 50 nm to 20 μm.

10. The membrane of claim 1, wherein the carbon nanotubes comprise sidewall functionalized carbon nanotubes.

11. The membrane of claim 1, wherein the support layer comprises a gas permeable polymer.

12. The membrane of claim 11, wherein the gas permeable polymer comprises a polymer chosen from polyamides, polyimides, polypyrrolones, polyesters, sulfone-based polymers, nitrile-based polymers, polymeric organosilicones, fluorinated polymers, polyolefins, copolymers thereof, and blends thereof.

13. The membrane of claim 1, wherein the support layer comprises a gas permeable polymer disposed on a base.

14. The membrane of claim 1, wherein the membrane further comprises a permeable layer disposed between the support layer and the selective polymer layer.

15. A method for separating a first gas from a feed gas stream, the method comprising contacting a membrane defined by claim 1 with the feed gas stream comprising the first gas under conditions effective to afford transmembrane permeation of the first gas.

16. A method of making a membrane comprising depositing a selective polymer layer on a support layer, the selective polymer layer comprising a selective polymer matrix and carbon nanotubes dispersed within the selective polymer matrix,
   wherein the selective polymer matrix comprises an amine-containing polymer and a mobile carrier comprising 2-(1-piperazinyl)ethylamine-sarcosine salt (PZEA-Sar) and 2-(1-piperazinyl)ethylamine-aminoisobutyric acid (PZEA-AIBA); and
   wherein the carbon nanotubes are wrapped in a hydrophilic polymer.

17. The membrane of claim 1, wherein the hydrophilic polymer comprises a polymer selected from the group consisting of polyallylamine, polyvinyl amine, polyethylenimine, copolymers thereof, and blends thereof.

18. The membrane of claim 10, wherein the sidewall functionalized carbon nanotubes comprise hydroxy-functionalized carbon nanotubes, carboxy-functionalized carbon nanotubes, amine-functionalized carbon nanotubes, or a combination thereof.

19. The membrane of claim 13, wherein the base comprises a non-woven fabric.

* * * * *